(12) United States Patent
Makino et al.

(10) Patent No.: US 10,854,920 B2
(45) Date of Patent: Dec. 1, 2020

(54) SOLID ELECTROLYTE COMPOSITION, ELECTRODE SHEET FOR ALL-SOLID STATE SECONDARY BATTERY, ALL-SOLID STATE SECONDARY BATTERY, AND METHODS FOR MANUFACTURING ELECTRODE SHEET FOR ALL-SOLID STATE SECONDARY BATTERY AND ALL-SOLID STATE SECONDARY BATTERY

(71) Applicant: FUJIFILM Corporation, Tokyo (JP)

(72) Inventors: Masaomi Makino, Kanagawa (JP); Hiroaki Mochizuki, Kanagawa (JP); Tomonori Mimura, Kanagawa (JP); Katsuhiko Meguro, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 152 days.

(21) Appl. No.: 15/828,578

(22) Filed: Dec. 1, 2017

(65) Prior Publication Data

US 2018/0090787 A1 Mar. 29, 2018

Related U.S. Application Data

(63) Continuation of application No. PCT/JP2016/072049, filed on Jul. 27, 2016.

(30) Foreign Application Priority Data

Jul. 30, 2015 (JP) ................................. 2015-150642

(51) Int. Cl.
*H01M 10/0565* (2010.01)
*H01B 1/06* (2006.01)
(Continued)

(52) U.S. Cl.
CPC ...... *H01M 10/0565* (2013.01); *C08G 83/003* (2013.01); *C08G 83/005* (2013.01);
(Continued)

(58) Field of Classification Search
CPC .. H01M 10/0565; H01M 10/056; H01M 4/13; H01M 4/62; H01M 10/0525;
(Continued)

(56) References Cited

U.S. PATENT DOCUMENTS

| 5,648,186 A | 7/1997 | Daroux et al. |
| 2012/0315547 A1* | 12/2012 | Itoh ..................... C08F 299/024 429/312 |

(Continued)

FOREIGN PATENT DOCUMENTS

| CN | 1116213 A | 2/1996 |
| JP | 2014-43487 A | 3/2014 |

(Continued)

OTHER PUBLICATIONS

US: American Chemical Society ACS, 2016, Registry No. 326794-48-3 (1 pg. total).

(Continued)

*Primary Examiner* — Gary D Harris
(74) *Attorney, Agent, or Firm* — Sughrue Mion, PLLC

(57) ABSTRACT

Provided are a solid electrolyte composition containing at least one dendritic polymer selected from the group consisting of dendrons, dendrimers, and hyperbranched polymers and a specific inorganic solid electrolyte, in which the dendritic polymer has at least one specific functional group, an electrode sheet for an all-solid state secondary battery and an all-solid state secondary battery for which the solid electrolyte composition is used, a method for manufacturing an electrode sheet for an all-solid state secondary battery, and a method for manufacturing an all-solid state secondary battery.

16 Claims, 2 Drawing Sheets

(51) Int. Cl.

| | | |
|---|---|---|
| *H01M 4/13* | (2010.01) | |
| *H01M 4/62* | (2006.01) | |
| *H01M 10/056* | (2010.01) | |
| *H01M 10/052* | (2010.01) | |
| *C08J 5/22* | (2006.01) | |
| *H01M 10/0562* | (2010.01) | |
| *C08G 83/00* | (2006.01) | |
| *C08L 101/00* | (2006.01) | |
| *C08L 101/06* | (2006.01) | |
| *H01M 10/0525* | (2010.01) | |

(52) U.S. Cl.
CPC .............. *C08J 5/22* (2013.01); *C08L 101/005* (2013.01); *C08L 101/06* (2013.01); *H01B 1/06* (2013.01); *H01M 4/13* (2013.01); *H01M 4/62* (2013.01); *H01M 4/622* (2013.01); *H01M 10/052* (2013.01); *H01M 10/056* (2013.01); *H01M 10/0525* (2013.01); *H01M 10/0562* (2013.01); *C08F 2500/01* (2013.01); *C08J 2300/202* (2013.01); *C08L 2203/20* (2013.01); *H01M 2300/0068* (2013.01); *H01M 2300/0082* (2013.01); *H01M 2300/0091* (2013.01); *Y02T 10/7011* (2013.01)

(58) Field of Classification Search
CPC ..... H01M 10/0562; H01M 2300/0068; H01M 2300/0082; H01M 10/052; H01M 2300/0091; H01M 4/622; C08G 83/003; C08G 83/005; C08L 101/005; C08L 101/06; C08L 10/0525; C08L 10/0562; C08L 2203/20; C08F 2500/01; C08J 2300/202; C08J 5/22; Y02T 10/7011; H01B 1/06
USPC ......................................................... 429/317
See application file for complete search history.

(56) References Cited

U.S. PATENT DOCUMENTS

2016/0172707 A1* 6/2016 Oh ....................... H01M 2/1686
429/144
2016/0204465 A1 7/2016 Mimura et al.

FOREIGN PATENT DOCUMENTS

| JP | 2014043487 A * | 3/2014 |
|---|---|---|
| WO | 2015/046312 A1 | 4/2015 |
| WO | 2015/046314 A1 | 4/2015 |

OTHER PUBLICATIONS

US: American Chemical Society ACS, 2016, Registry No. 163442-67-9 (1 pg. total).
Takeshi Niitani et al., "Star-Shaped Polymer Electrolyte with Microphase Separation Structure for All-Solid-State Lithium Batteries", Journal of the Electrochemical Society, 2009, pp. A577-A583, vol. 156, No. 7 (7 pages total).
Jisedaigata Lithium Ion Niji Denchi, Toray Research Center Inc. Chosa Kenkyubu, 2010. 06, pp. 166-168 (4 pages total).
International Search Report of PCT/JP2016/072049 dated Nov. 1, 2016 [PCT/ISA/210].
International Preliminary Report on Patentability dated Jul. 12, 2017, issued by the International Bureau in International Application No. PCT/JP2016/072049.
Communication dated Sep. 17, 2019, from the State Intellectual Property Office of the P.R.C in application No. 201680037190.1.
Zhao et al., "Novel electrolytes based on aliphatic oligoether dendrons", Journal of Power Sources, 2009, vol. 189, pp. 359-364 (total 6 pages).
Feng et al., "Properties of Solid Polymier Electrolytes based on Hyperbranched Polyether", Journal of South China Normal University (Natural Science Edition), Nov. 2019, pp. 94-95 (total 2 pages).
Communication dated Aug. 12, 2020 from the State Intellectual Property Office of the P.R.C. In corresponding Application No. 201680037190.1.

* cited by examiner

SOLID ELECTROLYTE COMPOSITION, ELECTRODE SHEET FOR ALL-SOLID STATE SECONDARY BATTERY, ALL-SOLID STATE SECONDARY BATTERY, AND METHODS FOR MANUFACTURING ELECTRODE SHEET FOR ALL-SOLID STATE SECONDARY BATTERY AND ALL-SOLID STATE SECONDARY BATTERY

CROSS-REFERENCE TO RELATED APPLICATIONS

This application is a Continuation of PCT International Application No. PCT/JP2016/072049 filed on Jul. 27, 2016, which claims priority under 35 U.S.C. § 119 (a) to Japanese Patent Application No. 2015-150642 filed in Japan on Jul. 30, 2015. Each of the above applications is hereby expressly incorporated by reference, in its entirety, into the present application.

BACKGROUND OF THE INVENTION

1. Field of the Invention

The present invention relates to a solid electrolyte composition, an electrode sheet for an all-solid state secondary battery, an all-solid state secondary battery, and methods for manufacturing an electrode sheet for an all-solid state secondary battery and an all-solid state secondary battery.

2. Description of the Related Art

For lithium ion batteries, electrolytic solutions have been used. Attempts are underway to produce all-solid state secondary batteries in which all constituent materials are solid by replacing the electrolytic solutions with solid electrolytes. Reliability in terms of all performance of batteries is an advantage of techniques of using inorganic solid electrolytes. For example, to electrolytic solutions being used for lithium ion secondary batteries, flammable materials such as carbonate-based solvents are applied as media. In lithium ion secondary batteries, a variety of safety measures are employed. However, there is a concern that disadvantages may be caused during overcharging and the like, and there is a demand for additional efforts. All-solid state secondary batteries in which non-flammable electrolytes can be used are considered as a fundamental solution therefor.

Another advantage of all-solid state secondary batteries is the suitability for increasing energy density by means of the stacking of electrodes. Specifically, it is possible to produce batteries having a structure in which electrodes and electrolytes are directly arranged in series. At this time, metal packages sealing battery cells and copper wires or bus-bars connecting battery cells may not be provided, and thus the energy density of batteries can be significantly increased. In addition, favorable compatibility with positive electrode materials capable of increasing potentials and the like can also be considered as advantages.

Due to the respective advantages described above, all-solid state secondary batteries are being developed as next-generation lithium ion batteries (New Energy and Industrial Technology Development Organization (NEDO), Fuel Cell and Hydrogen Technologies Development Department, Electricity Storage Technology Development Section, "NEDO 2013 Roadmap for the Development of Next Generation Automotive Battery Technology" (August, 2013)). In addition, compositions that are used to manufacture secondary batteries are also being developed. For example, JP2014-43487A describes a composition including a hyperbranched polymer and a lithium salt.

SUMMARY OF THE INVENTION

The invention described in JP2014-43487A has an object of providing a hyperbranched polymer that is preferable as a matrix polymer. However, JP2014-43487A does not disclose any all-solid state secondary batteries including a positive electrode active material layer, a solid electrolyte layer, and a negative electrode active material layer.

Electrode active materials and solid electrolytes that are used in all-solid state secondary batteries are both solid particles. Therefore, the affinity (binding property) among electrode active material particles, among the solid electrolyte particles, or between electrode active materials and solid electrolytes is poor, and fine pores are likely to be generated among these solid particles. These pores cause a decrease in ion conductivity. In order to suppress the influence of the pores and increase ion conductivity between solid particles (solid-solid interfaces), all-solid state secondary batteries need to be used in a pressurized state.

An object of the present invention is to provide a solid electrolyte composition capable of enhancing the binding property among solid particles in layers by being used to form the layers (positive electrode active material layers, solid electrolyte layers, and/or negative electrode active material layers) of all-solid state secondary batteries and capable of realizing excellent ion conductivity between solid particles even without being pressurized, an electrode sheet for an all-solid state secondary battery and an all-solid state secondary battery for which the solid electrolyte composition is used. In addition, another object of the present invention is to provide a method for manufacturing the electrode sheet for an all-solid state secondary battery and an all-solid state secondary battery for which the solid electrolyte composition is used.

Here, "even without being pressurized" refers to a case in which batteries are driven without being pressurized or under the application of a pressure of 1 MPa or lower. Even in a case in which the atmospheric pressure (0.1 MPa) or a pressure that is equal to or higher than the atmospheric pressure (up to 1 MPa) is applied, the application of pressures of 1 MPa or lower is not considered as the pressurization as long as the pressurization is not intended for treatments for forming battery sheets (for example, lamination treatments). In the present specification, pressurization refers to the application of pressures of higher than 1 MPa or the driving of batteries by applying pressures of higher than 1 MPa.

As a result of intensive studies in consideration of the above-described objects, the present inventors found that, in a composition containing an inorganic solid electrolyte, in a case in which a dendritic polymer having a specific functional group with an affinity to solid particles is caused to coexist, it is possible to improve the dispersion stability of the solid particles in the composition, all-solid state secondary batteries produced using this solid electrolyte composition are excellent in terms of the binding property among the solid particles, and the same degree of ion conductivity as in a pressurized state can be realized even without pressurizing batteries. This is considered to be because the improvement of the dispersion stability enables the additional evening of distances between the solid particles in the respective layers formed using the solid electrolyte composition and, furthermore, the specific functional group also acts to form favorable interfaces between the solid particles. The present invention is based on the above-described finding.

That is, the object is achieved by the following means.

<1> A solid electrolyte composition comprising: at least one dendritic polymer selected from the group consisting of dendrons, dendrimers, and hyperbranched polymers; and an inorganic solid electrolyte having conductivity of ions of metals belonging to Group I or II of the periodic table, in which the dendritic polymer has at least one functional group selected from a group of functional groups (A).

<Group of Functional Groups (A)> a hydroxy group, a thiol group, a carboxy group, a sulfonic acid group, a phosphoric acid group, an amino group, a cyano group, an isocyanate group, an acid anhydride group, a (meth)acryloyloxy group, an epoxy group, an oxetanyl group, an alkoxide group, a group having a ring structure of three or more rings, an amide group, a urea group, a urethane group, an imide group, and an isocyanurate group.

<2> The solid electrolyte composition according to <1>, in which the dendritic polymer has 8 to 2,500 molecular terminal portions in a molecule.

<3> The solid electrolyte composition according to <1> or <2>, in which a number-average molecular weight of the dendritic polymer is 500 to 500,000.

<4> The solid electrolyte composition according to any one of <1> to <3>, in which an average particle diameter of the dendritic polymer is 1 nm to 100 nm.

<5> The solid electrolyte composition according to any one of <1> to <4>, in which the dendritic polymer has an arm portion extending from the molecular terminal portion, and the arm portion is a continuous chain-like polymer having a number-average molecular weight of 1,000 or more and has at least one substituent selected from a group of substituents (a).

<Group of Substituents (a)> an alkyl group having 8 or more carbon atoms, an alkenyl group having 8 or more carbon atoms, an alkynyl group having 8 or more carbon atoms, a polyether group, a polycarbonate group, a polyester group, and a polysiloxane group which have a number-average molecular weight of 300 or more.

<6> The solid electrolyte composition according to any one of <1> to <5>, in which the group having a ring structure of three or more rings is a residue of a compound represented by General Formula (1) or (2).

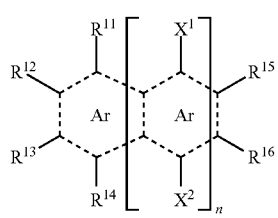

General Formula (1)

In General Formula (1), Ar represents a benzene ring. n represents an integer of 0 to 8. $R^{11}$ to $R^{16}$ each independently represent a hydrogen atom or a substituent. $X^1$ and $X^2$ each independently represent a hydrogen atom or a substituent. Here, in $R^{11}$ to $R^{16}$, $X^1$, and $X^2$, groups adjacent to each other may be bonded to each other and thus form a five or six-membered ring. Here, in a case in which n is zero, the substituent as any one of $R^{11}$ to $R^{13}$ is —$(Ar^1)$m-Rxx or any two of $R^{11}$ to $R^{13}$ are bonded to each other and thus form —$(Ar^1)$m-. Here, $Ar^1$ represents a phenylene group, m represents an integer of 2 or more, and Rxx represents a hydrogen atom or a substituent. In addition, in a case in which n is one, in $R^{11}$ to $R^{16}$, $X^1$, and $X^2$, at least two groups adjacent to each other are bonded to each other and thus form a benzene ring.

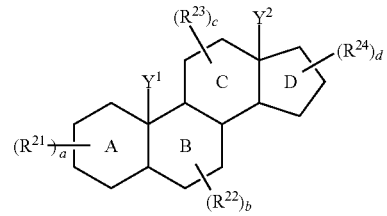

General Formula (2)

In General Formula (2), $Y^1$ and $Y^2$ each independently represent a hydrogen atom, a methyl group, or a formyl group. $R^{21}$, $R^{22}$, $R^{23}$, and $R^{24}$ each independently represent a substituent, and a, b, c, and d represent an integer of 0 to 4.

Here, an A ring may be a saturated ring, an unsaturated ring or aromatic ring having one or two double bonds, a B ring and a C ring may be unsaturated rings having one or two double bonds. Meanwhile, in a case in which each of a, b, c, and d is an integer of 2 to 4, substituents adjacent to each other may be bonded to each other and thus form a ring.

<7> The solid electrolyte composition according to any one of <1> to <6>, in which a content of the dendritic polymer is 0.01 to 20 parts by mass with respect to 100 parts by mass of the inorganic solid electrolyte.

<8> The solid electrolyte composition according to any one of <1> to <7>, further comprising: a lithium salt.

<9> The solid electrolyte composition according to any one of <1> to <8>, in which the inorganic solid electrolyte is a sulfide-based inorganic solid electrolyte.

<10> The solid electrolyte composition according to any one of <1> to <9>, further comprising: at least one solvent selected from the group consisting of an alcohol compound solvent, an ether compound solvent, an amide compound solvent, an aromatic compound solvent, an ester compound solvent, and an aliphatic compound solvent.

<11> An electrode sheet for an all-solid state secondary battery comprising: a collector; and a solid electrolyte layer containing at least one dendritic polymer selected from the group consisting of dendrons, dendrimers, and hyperbranched polymers and an inorganic solid electrolyte having conductivity of ions of metals belonging to Group I or II of the periodic table, in which the dendritic polymer has at least one functional group selected from a group of functional groups (A).

<Group of Functional Groups (A)> a hydroxy group, a thiol group, a carboxy group, a sulfonic acid group, a phosphoric acid group, an amino group, a cyano group, an isocyanate group, an acid anhydride group, a (meth)acryloyloxy group, an epoxy group, an oxetanyl group, an alkoxide group, a group having a ring structure of three or more rings, an amide group, a urea group, a urethane group, an imide group, and an isocyanurate group.

<12> A method for manufacturing an electrode sheet for an all-solid state secondary battery, the method comprising:

a step of applying a wet slurry of the solid electrolyte composition according to any one of <1> to <10>; and a step of drying the slurry.

<13> An all-solid state secondary battery comprising: the electrode sheet for an all-solid state secondary battery according to <11>.

<14> A method for manufacturing an all-solid state secondary battery, the method comprising: manufacturing an all-solid state secondary battery having a positive electrode active material layer, a solid electrolyte layer, and a negative electrode active material layer in this order through the manufacturing method according to <12>.

In the description of the present invention, numerical ranges expressed using "to" include numerical values before and after "to" as the lower limit value and the upper limit value.

In the description of the present invention, in the case of being simply expressed, "acryl" is used to refer to both methacryl and acryl.

In the description of the present invention, "the group having a ring structure of three or more rings" refers to a group obtained by desorbing at least one hydrogen atom or substituent from a compound having a ring structure of three or more rings.

"The residue of the compound represented by General Formula (1) or (2)" refers to a group obtained by desorbing at least one hydrogen atom or substituent from the compound represented by General Formula (1) or (2).

The solid electrolyte composition of the present invention has excellent dispersion stability, is capable of enhancing the binding property among solid particles in layers by being used to form the layers of all-solid state secondary batteries, and is capable of realizing excellent ion conductivity between solid particles even without pressurizing batteries. In addition, the electrode sheet for an all-solid state secondary battery and the all-solid state secondary battery of the present invention are excellent in terms of the binding property among solid particles in layers and are capable of realizing excellent ion conductivity between solid particles even without being pressurizing. Furthermore, according to the method for manufacturing an electrode sheet for an all-solid state secondary battery and an all-solid state secondary battery of the present invention, it is possible to manufacture the electrode sheet for an all-solid state secondary battery and the all-solid state secondary battery of the present invention which have the above-described characteristics.

The above-described and other characteristics and advantages of the present invention will be further clarified by the following description with appropriate reference to the accompanying drawings.

DESCRIPTION OF THE PREFERRED EMBODIMENTS

A solid electrolyte composition of the present invention contains at least one dendritic polymer selected from the group consisting of dendrons, dendrimers, and hyperbranched polymers and an inorganic solid electrolyte having conductivity of ions of metals belonging to Group I or II of the periodic table.

Here, the dendritic polymer has at least one functional group selected from a group of functional groups (A). Hereinafter, functional groups belonging to the group of functional groups (A) will also be referred to as specific functional groups.

<Group of Functional Groups (A)> a hydroxy group, a thiol group (a mercapto group), a carboxy group, a sulfonic acid group, a phosphoric acid group, an amino group, a cyano group, an isocyanate group, an acid anhydride group, a (meth)acryloyloxy group, an epoxy group, an oxetanyl group, an alkoxide group (an alkoxy group), a group having a ring structure of three or more rings, an amide group (—C(=O)—NR—), a urea group (—NR—C(=O)—NR—), a urethane group (—NR—C(=O)—O—), an imide group (—C(=O)—NR—C(=O)—), and an isocyanurate group (the structure will be illustrated below. In the following structure, "*" indicates a dangling bond).

Meanwhile, R represents a hydrogen atom, an alkyl group, or an aryl group. Preferred examples of the alkyl group or the aryl group represented by R include an alkyl group or an aryl group represented by $R^{11}$ described below.

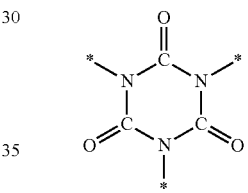

In addition, dendritic polymers that can be used in the present invention may also have a specific substituent in order to improve the dispersion stability of the solid electrolyte composition.

Hereinafter, a preferred embodiment will be described.

Preferred Embodiment

Figure 1:
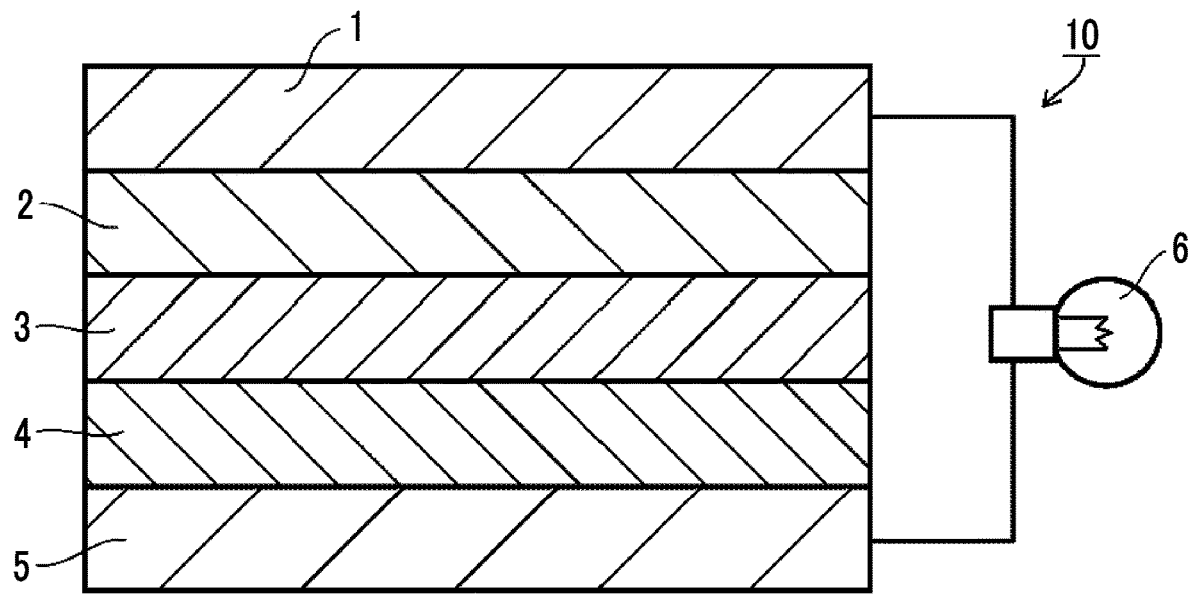
FIG. 1 is a vertical cross-sectional view schematically illustrating an all-solid state secondary battery according to a preferred embodiment of the present invention.

FIG. 1 is a cross-sectional view schematically illustrating an all-solid state secondary battery (lithium ion secondary battery) according to a preferred embodiment of the present invention. In the case of being seen from the negative electrode side, an all-solid state secondary battery 10 of the present embodiment has a negative electrode collector 1, a negative electrode active material layer 2, a solid electrolyte layer 3, a positive electrode active material layer 4, and a positive electrode collector 5 in this order. The respective layers are in contact with one another and have a laminated structure. In a case in which the above-described structure is employed, during charging, electrons (e⁻) are supplied to the negative electrode side, and lithium ions (Li⁺) are accumulated on the negative electrode side. On the other hand, during discharging, the lithium ions (Li⁻) accumulated on the negative electrode side return to the positive electrode, and electrons are supplied to an operation portion 6. In the example illustrated in the drawing, an electric bulb is employed as the operation portion 6 and is lit by discharging. The solid electrolyte composition of the present invention can be preferably used as a material used to form the negative electrode active material layer, the positive electrode active material layer, and the solid electrolyte layer.

Meanwhile, in a case in which an all-solid state secondary battery having the layer constitution illustrated in FIG. 1 is put into a 2032-type coin case, there are cases in which the all-solid state secondary battery having the layer constitution illustrated in FIG. 1 will be referred to as an electrode sheet for an all-solid state secondary battery, and batteries produced by putting this electrode sheet for an all-solid state secondary battery into a 2032-type coin case will be distinctively referred to as all-solid state secondary batteries.

The thicknesses of the positive electrode active material layer 4, the solid electrolyte layer 3, and the negative electrode active material layer 2 are not particularly limited. Meanwhile, in a case in which the dimensions of ordinary batteries are taken into account, the thicknesses are preferably 10 to 1,000 μm and more preferably 20 μm or more and less than 500 μm. In the all-solid state secondary battery of the present invention, the thickness of at least one layer of the positive electrode active material layer 4, the solid electrolyte layer 3, or the negative electrode active material layer 2 is still more preferably 50 μm or more and less than 500 μm.

In the present specification, there are cases in which the positive electrode active material layer and the negative electrode active material layer are collectively referred to as electrode layers. In addition, as electrode active materials that can be used in the present invention, there are a positive electrode active material that is included in the positive electrode active material layer and a negative electrode active material that is included in the negative electrode active material layer, and there are cases in which either or both layers are simply referred to as active materials or electrode active materials.

Hereinafter, a solid electrolyte composition which can be preferably used to manufacture an all-solid state secondary battery of the present invention will be described.

<Solid Electrolyte Composition>

(Dendritic Polymer)

Dendritic polymers that can be used in the present invention refer to highly branched polymers having a portion that is located in the central portion of a molecule, which is referred to as "core" in terms of chemical structures, and portions of a plurality of high-molecular-weight bodies linked to the core, which are referred to as "branches". Dendritic polymers that can be used in the present invention are dendrons, dendrimers, and hyperbranched polymers, and, among these, dendrimers and hyperbranched polymers are preferred.

Meanwhile, hereinafter, there are cases in which the core will be referred to as the core portion and the branch will be referred to as the branch portion.

—Dendrons—

Hereinafter, an example of the structural formula of a dendron and, for comparison, an example of the structural formula of a dendrimer will be illustrated. Meanwhile, the central portion of the dendron is also referred to as the focal point.

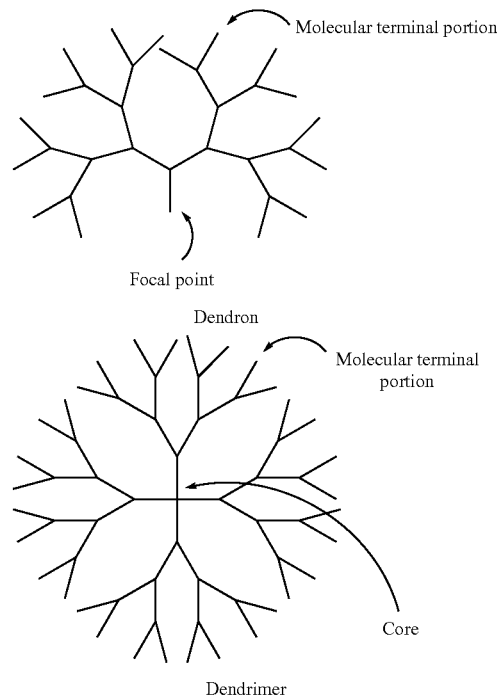

A dendron is a wedge-shaped segment of a monodisperse dendrimer, has a plurality of molecular terminal portions, and has one highly reactive functional group at the focal point which is one molecular terminal portion.

In the present invention, the specific functional group can be introduced into an arbitrary portion in the dendron and can also be introduced as a molecular terminal portion of the dendron. In addition, it is also possible to synthesize polymers having specific substituents described below using these molecular terminal portions as polymerization initiation points.

As dendrons that can be used in the present invention, commercially available products can be used. Commercially available products can be procured from, for example, Aldrich-Sigma, Co. LLC. Specific examples of dendrons manufactured by Aldrich-Sigma, Co. LLC. include polyester-8-hydroxyl-1-acetylene bis-MPA dendron, generation 3 (Catalog No. 686646), polyester-16-hydroxyl-1-acetylene bis-MPA dendron, generation 4 (Catalog No. 686638), polyester-32-hydroxyl-1-acetylene bis-MPA dendron, generation 5 (Catalog No. 686611), polyester-8-hydroxyl-1-carboxyl bis-MPA dendron, generation 3 (Catalog No. 686670), polyester-16-hydroxyl-1-carboxyl bis-MPA dendron, generation 4 (Catalog No. 686662), and polyester-32-hydroxyl-1-carboxyl bis-MPA dendron, and generation 5 (Catalog No. 686654).

—Dendrimers—

"Dendrimers" refer to polymers in which a highly symmetric and regular branched structure extends from the core in three dimensions. In dendrimers, spaces between a branch and a branch form a repetition of a certain definite chemical bond that is referred to as "dendron".

Hereinafter, in the description of the present invention, the repetition of a chemical bond in dendrimers will be referred to as a dendron structure.

Dendrimers are similar to hyperbranched polymers in terms of the fact that repeating units are branched and extend. However, dendrimers are different from hyperbranched polymers and other polymers in terms of the fact that branches form a regular and clear structure and there is no molecular weight distribution, that is, the molecular weight is uniform. The sizes of dendrimers are expressed using a term "generation" on the basis of the number of dendron structures linked to the core.

In order to manufacture dendrimers, it is necessary to strictly control the reaction conditions and stoichiometry. It is said that, as the numerical values indicating the generation increase, the sizes of dendrimers increase, and the shapes become more spherical. Books regarding dendrimers are being successively published, and examples thereof include "Topics in Current Chemistry" Vol. 228, Dendrimer V, C. A. Schalley, F. Vogtle, 2003, published by Springer and "Science and Functions of Dendrimers", Masahiko OKADA, published by IPC Co. Ltd.

In addition, dendrimers that can be used in the present invention refer to multibranched compounds having a regular branch structure and a uniform molecular weight; however, even in a case in which compounds have a plurality of chain-like branched portions around the core portion, hyperbranched polymers having a poor regularity or compounds in which branched chain-like portions are straight chains and do not have a branch structure are not considered as dendrimers.

Meanwhile, dendrimers are described in detail in Angew. Chem., Int. Ed. 38, p. 884 (1999) and the like.

Regarding methods for synthesizing dendrimers, there are a number of examples reported such as a divergent method in which dendrimers are synthesized from the core toward the outside, a convergent method in which dendrimers are synthesized from terminal functional groups toward the inside, and combinations of the two methods.

Figure 3:
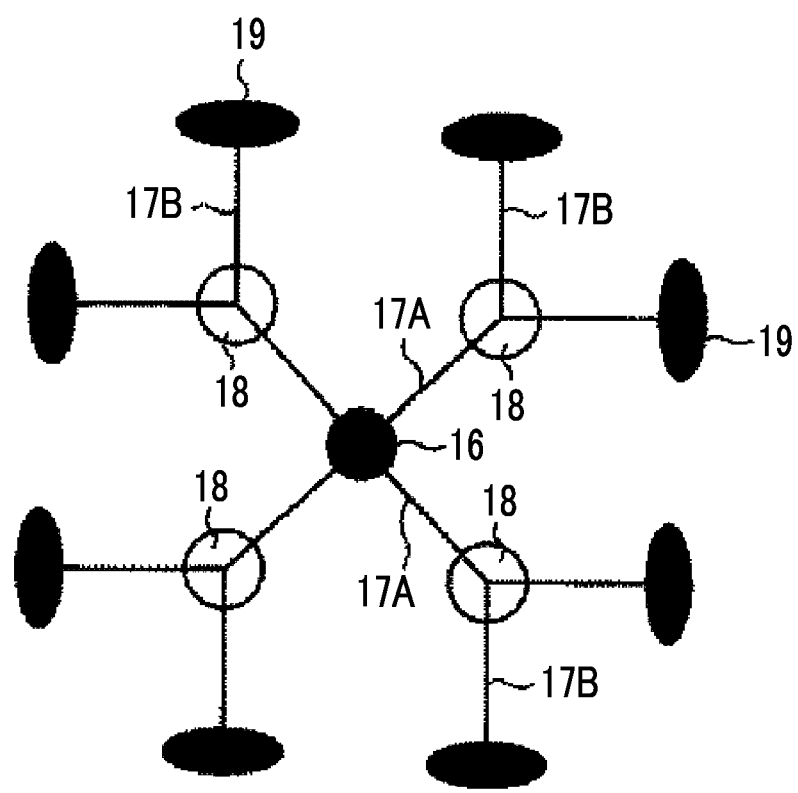
FIG. 3 is a cross-sectional view illustrating an example of a dendrimer that can be used in the present invention.

Dendrimers that can be used in the present invention have a dendritic multibranched structure made up of the core portion, branched portions, branch portions, and molecular terminal portions. The molecular structure of a dendrimer will be described using the drawing. FIG. 3 is a schematic view illustrating an example of a standard dendrimer that can be used in the present invention.

A core portion 16 that is the center has a plurality of branch portions 17A, the terminal portions of the branch portions 17A are branched portions 18, new branch portions 17B are branched from the branched portions, and the respective branch portions 17B have a molecular terminal portion 19. In this schematic view, the branched portions 18 are present only at the terminals of the branch portions 17A that are generated from the core portion 16, but the constitution is not limited thereto, and the terminals of the branch portions 17B that continue from the branched portion 18 may serve as branched portions and have a plurality of new branch portions in the structure.

In the present invention, arm portions described below may extend from the molecular terminal portions 19.

Meanwhile, in the description of the present invention, there are also cases in which the terminals of the molecular terminal portions and/or the arm portions will be simply referred to as terminals.

As described above, generally, in the case of dendrimers having a favorable regularity, the sizes thereof are expressed using a conceptual term of generation. In the present invention, the core portion according to the above definition is considered as generation 0, a branch structure starting from the core portion, that is, the branch portions 17A and the branched portions 18 in FIG. 3, is referred to as generation 1, and a structure having a branch structure branched from all of the terminal portions of generation 1 (the branched portions 18 in FIG. 3), that is, the branch portions 17B and the molecular terminal portions 19 located at the front end thereof, is referred to as generation 2. What has been described above will be considered as the definition of generation in the present invention.

The sizes of dendrimers that can be used in the present invention are preferably generations 2 to 10, more preferably generations 2 to 8, and particularly preferably generations 2 to 6.

In the present invention, the dendritic polymer preferably has the specific functional group at the terminal. That is, in a case in which the dendritic polymer is the dendrimer illustrated in FIG. 3, the dendritic polymer preferably has the specific functional group at the molecular terminal portion 19 in FIG. 3. In addition, the dendritic polymer also preferably has a specific substituent described below at the molecular terminal portion.

Hereinafter, preferred structures of the core portion, the branched portion, the branch portion, and the terminal portion of dendrimers that can be used in the present invention will be sequentially described.

In the present invention, the core portion needs to have a structure in which at least three branch portions are bonded to the core portion.

Typical structures of the core portion will be illustrated below. Examples of the core portion constituted of one atom include Formulae (2-a) and (2-b) in which the center is constituted of a tri- or higher-valent atom, for example, N or C. The core portion may be constituted of a combination thereof. Examples of the core portion constituted of a cyclic compound include cores portions represented by Formulae (2-c), (2-d), and (2-e). As illustrated below, the cyclic structure may be an aromatic ring structure, an alicyclic structure, or a heterocyclic structure.

In addition, structures formed by combining a plurality of atoms around a polyvalent atom as illustrated in (2-f) or (2-g) or metal atoms can also be exemplified as the core portion, and the structures as illustrated in (2-f) or (2-g) exemplified herein can be used not only as the core portion but also as the branched portion described below.

Meanwhile, the structures represented by any one of Formulas (2-h) to (2-k) are examples of a structure corresponding to the core portion alone, and these structures preferably have four or more branches in the core portion. In Formulae (2-h) to (2-k), Rx is an alkylene group having 1 to 12 carbon atoms and preferably 1 to 6 carbon atoms.

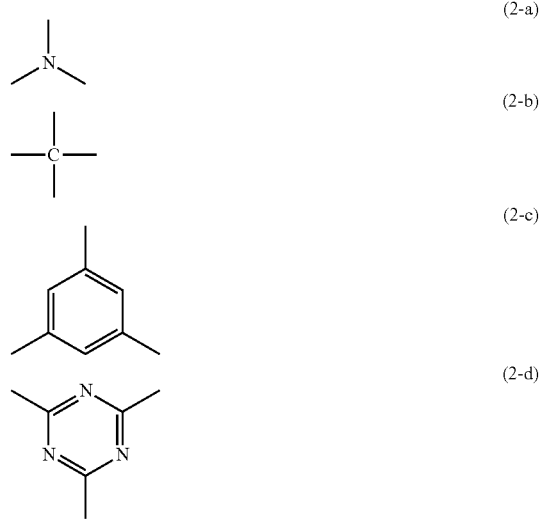

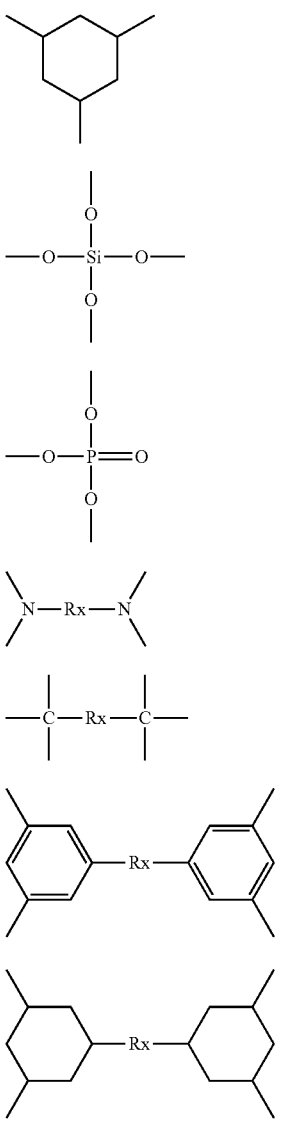

Specific examples of the core portion include a diamine core, a polyphenylene core, a polyphenylene ether core, and the like. Examples of ordinary dendrimers include polyamideamine dendrimers, and, as the core portion, an ethylene diamine core, 1,4-diaminobutane, 1,6-diaminohexane, 1,12-diaminododecane, cystamine, or the like is preferably used.

In dendrimers that can be used in the present invention, the branch portion is a collective term of constituent portions that bond one core portion or branched portion and an adjacent branched portion or terminal portion, and the structure is not particularly limited.

In addition, the total number of the branch portions present in one dendrimer molecule (the total number of branch portions directly linked to the core portion and branch portions linked to branched portions) is preferably 9 to 5,000, more preferably 12 to 500, and particularly preferably 18 to 100.

The branched portion in dendrimers that can be used in the present invention is constituted of a tri- or higher-valent atom or atomic group, is not particularly limited as long as the branched portion has a bonding with the adjacent core portion or a linking portion located on the core portion side and a bonding with a plurality of branch portions linked in the terminal direction, and branch portions having the same structure as the core portion described above can also be used; however, generally, the branched portion is constituted of a carbon atom, a nitrogen atom, or an atomic group including these atoms.

Dendrimers that can be used in the present invention can be synthesized using an ordinary method. Specific methods are described in Shi W. et. al., J. Appl. Polym. Sci., 59, 12, 1945 (1996), Moszner N. et. al., Macromol. Chem. Phys., 197, 2, 621 (1996), Qichun W. Scott R. et al., Pure Appl. Chem., A 37 (11), 1301 (2000), Qichun W. Scott R. et. al., Pure Appl. Chem., A39 (4), 267 (2000), Shiyoshi YOKOYAMA, Shinro MASHIKO, collection of papers of macromolecules, Vol. 59, No. 10, 642 (2002), and the like.

In addition, commercially available products can be procured from Aldrich-Sigma, Co. LLC. Examples thereof include polyamideamine dendrimer, ethylenediamine core, generation 0.0 (Catalog No.: 412368), polyamideamine dendrimer, ethylenediamine core, generation 1.0 (Catalog No.: 412368), polyamideamine dendrimer, ethylenediamine core, generation 2.0 (Catalog No.: 412406), polyamideamine dendrimer, ethylenediamine core, generation 3.0 (Catalog No.: 412422), polyamideamine dendrimer, ethylenediamine core, generation 4.0 (Catalog No.: 412446), polyamideamine dendrimer, ethylenediamine core, generation 5.0 (Catalog No.: 536709), polyamideamine dendrimer, ethylenediamine core, generation 6.0 (Catalog No.: 536717), polyamideamine dendrimer, ethylenediamine core, generation 7.0 (Catalog No.: 536725), and the like in which the terminal is an amino group. Dendrimers having a hydroxy group, a carboxy group, or a trialkoxysilyl group instead of the terminal amino group can be procured.

—Hyperbranched Polymers—

"Hyperbranched polymers" refer to a structure in which a repeating unit corresponding to a "branch" is branched from the core and extends. The repeating unit is randomly branched, and there is a molecular weight distribution.

The hyperbranched polymers are polydisperse dendritic macromolecules having similar properties to dendrimers. However, hyperbranched polymers are synthesized by a single stage of polymerization reaction. Compared to dendrimers, hyperbranched polymers have characteristics that branches are incomplete, the number of terminal functional groups is an average value, and the cost efficiency is superior to complete dendrimer products. In a case in which a complete structure is not required, the use of hyperbranched polymers enables the advantages of dendrimers to be used at significantly low costs.

In hyperbranched polymers, as described above, branches of the branch portions extending from the core are randomly generated, and the regulation of the structure and the molecular weight distribution are not as strict as in dendrimers, and thus hypoerbranched polymers are mixtures of compounds having different molecular weights or different branch degrees.

Hyperbranched polymers that can be used in the present invention are polydisperse macromolecules which have two kinds of substituents in a molecule in a total number of three or more and are synthesized by means of the self-condensation of so-called ABx-type molecules. Examples thereof include the hyperbranched polymers described in Koji ISHIZU's "Nanotechnology of branched polymers" (2000, IPC Co. Ltd.) and the like.

Examples of the method for manufacturing these hyperbranched polymers include methods in which a primary amine is used as a nucleophilic component and hyperbranched polymers are synthesized by means of the ring-opening polymerization of cyclic compounds using a palladium catalyst as described in M. Suzuki et al; Macromolecules, Vol. 25, p. 7071 (1992) and Vol. 31, p. 1716 (1998). In a case in which the specific functional group is added to hyperbranched polymers obtained using the above-described method, it is possible to obtain hyperbranched polymers that can be used in the present invention.

In the present invention, examples of hyperbranched polymers that are preferably used include HP-1 to HP-5 manufactured using the following manufacturing method.

In the following formulae, a, b, and c represent copolymerization compositional ratios and have a unit of % by mole (a+b+c=100).

In addition, commercially available products can also be procured from Aldrich-Sigma, Co. LLC. Examples thereof include hyperbranched bis-MPA polyester-16-hydroxyl, generation 2 (Catalog No.: 686603), hyperbranched bis-MPA polyester-32-hydroxyl, generation 3 (Catalog No.: 686581), hyperbranched bis-MPA polyester-64-hydroxyl, generation 4 (Catalog No.: 686573), and the like.

The terminal active groups of these hyperbranched polymers can also be substituted using arbitrary reactions.

Method for Bonding Polymers from Terminal Groups

Commercially available dendritic polymer terminals can also be modified in the following manner.

For example, a radical polymer having a carboxylic acid at a polymer terminal is obtained using mercaptopropionic acid as a chain transfer agent and then can be bonded to an

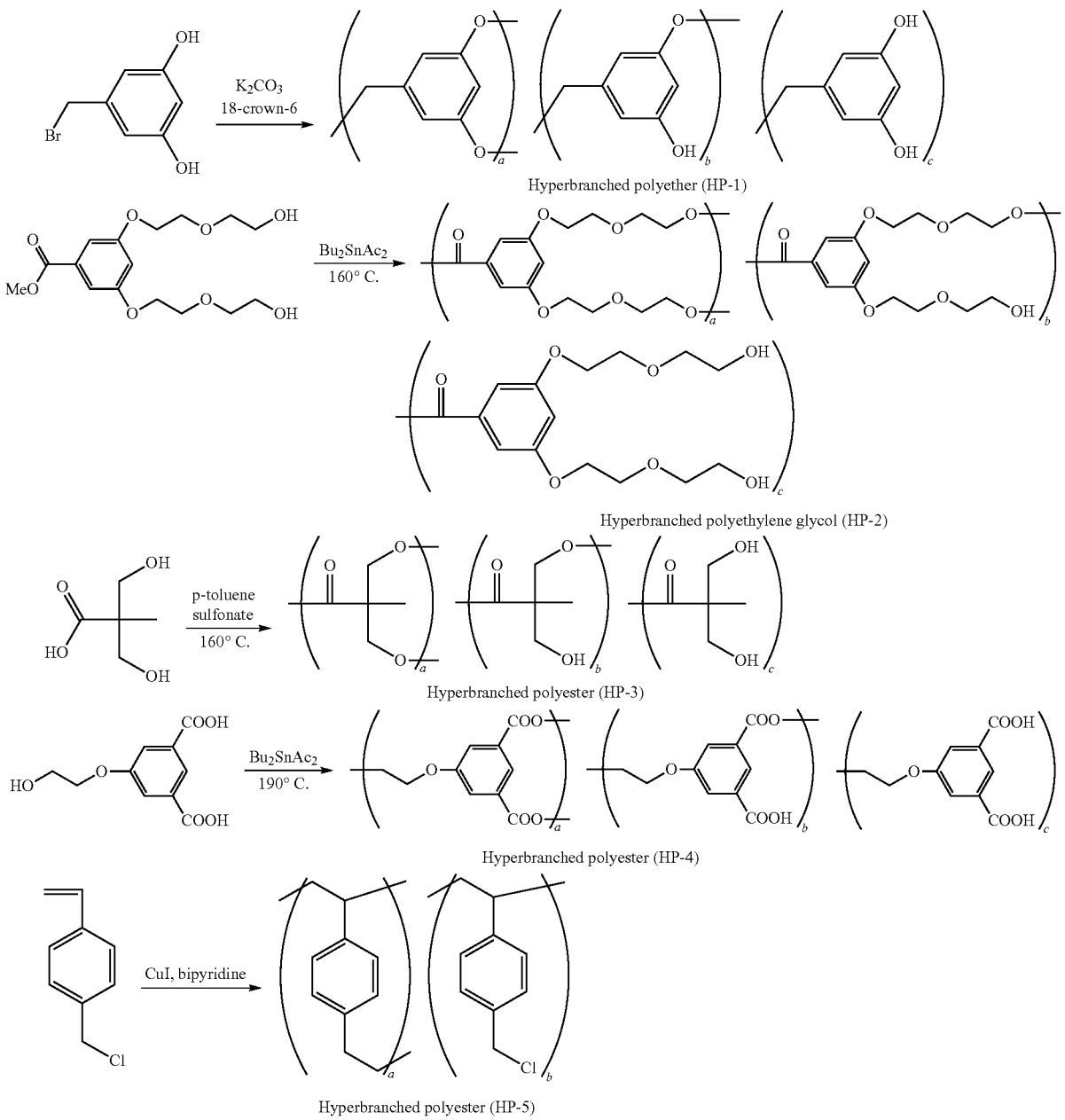

OH group at a commercially available dendritic polymer terminal by forming a dehydrated ester.

For example, bromoisobutyryl bromide is reacted with a dendritic polymer having a terminal OH group so as to brominate the terminal, and polymers can be produced by means of atom transfer radical polymerization (ATRP) using this terminal as a starting point. Ordinary monomers that can be radical-polymerized can be used. Examples thereof include acrylic monomers, methacrylic monomers, acrylamide-based monomers, methacrylamide-based monomers, styrene-based monomers, vinyl-based monomers, and the like. The group of specific functional groups and a specific substituent described below may be present as functional groups in these monomers.

—Specific Functional Groups—

Dendritic polymers that can be used in the present invention may have the specific functional group and a specific substituent described below in any portions among the inside (the core portion or the branch portions) of the dendritic polymer, the molecular terminal portions, and, furthermore, the arm portions ahead of the molecular terminal portions and preferably have the specific functional group and the specific substituent in the molecular terminal portions and/or the arm portions.

Here, having the specific functional group in the molecular terminal portion means that the molecular terminal portion is the specific functional group and the molecular terminal portion has the specific functional group through a divalent linking group L.

Specific examples of the divalent linking group L include an alkylene group, an arylene group, and the main chain of polymers (preferably having a number-average molecular weight of 200 to 50,000). The divalent linking group L may also include an oxygen atom, a sulfur atom, and —N(R)— in molecular chains. Here, R represents a hydrogen atom or an alkyl group.

The number of carbon atoms in the alkylene group is preferably 1 to 30 and more preferably 2 to 20, and specific examples thereof include an ethylene group, a propylene group, and a hexamethylene group.

The number of carbon atoms in the arylene group is preferably 6 to 30 and more preferably 6 to 20, and specific examples thereof include a phenylene group, a naphthylene group, and a pyrenylene group.

The specific functional groups can be classified into groups of functional groups (I) and (II) depending on their actions.

Group of Functional Groups (I)

A hydroxy group, a thiol group, a carboxy group, a sulfonic acid group, a phosphoric acid group, an amino group, a cyano group, an isocyanate group, an acid anhydride group (preferably an acid anhydride group having 3 to 10 carbon atoms), a (meth)acryloyloxy group, an epoxy group, an oxetanyl group, an alkoxide group (preferably a metal alkoxide-derived alkoxide group having 3 to 10 carbon atoms), and a group having a ring structure of three or more rings Functional groups belonging to the group of functional groups (I) have a physical and chemical adsorption capability to the surfaces of electrode active materials in the positive electrode active material layer and the negative electrode active material layer, and thus the dendritic polymer that is used in the present invention has a strong binding property to electrode active materials. Additionally, unlike linear polymers, the dendritic polymer has a small occupancy volume of polymer chains, and thus the coating area of the surfaces of individual particles is small, and the conductivity of lithium ions is not easily hindered.

In the present invention, the group having a ring structure of three or more rings is preferably a residue of a compound represented by General Formula (1) or (2).

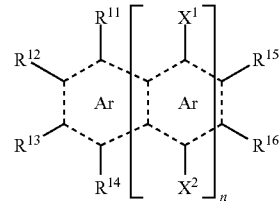

General Formula (1)

In General Formula (1), Ar represents a benzene ring. n represents an integer of 0 to 8. $R^{11}$ to $R^{16}$ each independently represent a hydrogen atom or a substituent. $X^1$ and $X^2$ each independently represent a hydrogen atom or a substituent. Here, in $R^{11}$ to $R^{16}$, $X^1$, and $X^2$, groups adjacent to each other may be bonded to each other and thus form a five or six-membered ring. Here, in a case in which n is zero, the substituent as any one of $R^{11}$ to $R^{16}$ is —$(Ar^1)$m-Rxx $(Ar^1)$m-Rxx or any two of $R^{11}$ to $R^{16}$ are bonded to each other and thus form —$(Ar^1)$m-. Here, $Ar^1$ represents a phenylene group, m represents an integer of 2 or more, and Rxx represents a hydrogen atom or a substituent. In addition, in a case in which n is one, in $R^{11}$ to $R^{16}$, $X^1$, and $X^2$, at least two groups adjacent to each other are bonded to each other and thus form a benzene ring.

Examples of the substituent represented by $R^{11}$ to $R^{16}$, $X^1$, $X^2$, and Rxx include an alkyl group, an aryl group, a heteroaryl group, an alkenyl group, an alkynyl group, an alkoxy group, an aryloxy group, a heteroaryloxy group, an alkylthio group, an arylthio group, a heteroarylthio group, an acyl group, an acyloxy group, an alkoxycarbonyl group, an aryloxycarbonyl group, an alkylcarbonyloxy group, an arylcarbonyloxy group, a hydroxy group, a carboxy group or a salt thereof, a sulfo group or a salt thereof, an amino group, a mercapto group, an amido group, a formyl group, a cyano group, a halogen atom, a (meth)acrylic group, a (meth)acryloyloxy group, a (meth)acrylamide group, an epoxy group, an oxetanyl group, combined groups thereof, and the like.

The combined group is preferably a combination of an alkyl group and a carboxy group, that is, an alkyl group having a carboxy group.

Meanwhile, in the following description, a formyl group is considered as an acyl group.

The number of carbon atoms in the alkyl group is preferably 1 to 30, more preferably 1 to 25, still more preferably 1 to 20, and particularly preferably 1 to 8. Specific examples thereof include methyl, ethyl, propyl, isopropyl, butyl, t-butyl, octyl, dodecyl, stearyl, benzyl, naphthylmethyl, pyrenylmethyl, and pyrenylbutyl. The dendritic polymer also preferably contains an unsaturated carbon bond of a double bond or a triple bond therein as the alkyl group.

The number of carbon atoms in the aryl group is preferably 6 to 30, more preferably 6 to 26, and particularly preferably 6 to 15. Specific examples thereof include phenyl, naphthyl, anthracene, terphenyl, tolyl, xylyl, methoxyphenyl, cyanophenyl, and nitrophenyl.

The number of carbon atoms in the heteroaryl group is preferably 1 to 30, more preferably 1 to 26, and particularly preferably 1 to 15. Specific examples thereof include furan, pyridine, thiophene, pyrrole, triazine, imidazole, tetrazole, pyrazole, thiazole, and oxazole.

The number of carbon atoms in the alkenyl group is preferably 2 to 30, more preferably 2 to 25, and particularly preferably 2 to 20. Specific examples thereof include vinyl and propenyl.

The number of carbon atoms in the alkynyl group is preferably 2 to 30, more preferably 2 to 25, and particularly preferably 2 to 20. Specific examples thereof include ethynyl, propynyl, and phenylethynyl.

The alkoxy group: The alkyl group constituting the alkoxy group is the same as the alkyl group.

The aryloxy group: The aryl group constituting the aryloxy group is the same as the aryl group.

The heteroaryloxy group: The heteroaryl group constituting the heteroaryloxy group is the same as the heteroaryl group.

The alkylthio group: The alkyl group constituting the alkylthio group is the same as the alkyl group.

The arylthio group: The aryl group constituting the arylthio group is the same as the aryl group.

The heteroarylthio group: The heteroaryl group constituting the heteroarylthio group is the same as the heteroaryl group.

The acyl group: The number of carbon atoms is preferably 1 to 30, more preferably 1 to 25, and still more preferably 1 to 20. The acyl group includes a formyl group, an aliphatic carbonyl group, an aromatic carbonyl group, and a heterocyclic carbonyl group. Examples thereof include the following groups.

Formyl, acetyl (methylcarbonyl), benzoyl (phenylcarbonyl), ethylcarbonyl, acryloyl, methacryloyl, octylcarbonyl, dodecylcarbonyl (stearic acid residue), linoleic acid residue, and linolenic acid residue The acyloxy group: The number of carbon atoms is preferably 1 to 30, more preferably 1 to 25, and still more preferably 1 to 20. The acyl group constituting the acyloxy group is the same as the acyl group.

The alkoxycarbonyl group: The number of carbon atoms is preferably 2 to 30, more preferably 2 to 25, and still more preferably 2 to 20. Specific examples of the alkyl group constituting the alkoxycarbonyl group include the specific examples of the alkyl group.

The aryloxycarbonyl group: The number of carbon atoms is preferably 7 to 30, more preferably 7 to 25, and still more preferably 7 to 20. Specific examples of the aryl group constituting the aryloxycarbonyl group include the specific examples of the aryl group.

The alkylcarbonyloxy group: The number of carbon atoms is preferably 2 to 30, more preferably 2 to 25, and still more preferably 2 to 20. Specific examples of the alkyl group constituting the alkylcarbonyloxy group include the specific examples of the alkyl group.

The arylcarbonyloxy group: The number of carbon atoms is preferably 7 to 30, more preferably 7 to 25, and still more preferably 7 to 20. Specific examples of the aryl group constituting the arylcarbonyloxy group include the specific examples of the aryl group.

Generally, these substituents can be introduced by the electrophilic substitution, nucleophilic substitution reaction, halogenation, sulfonation, or diazotation of the compound represented by General Formula (1) or a combination thereof. Examples thereof include alkylation by the Friedel-Crafts reaction, acylation by the Friedel-Crafts reaction, the Vilsmeier reaction, and transition metal catalyst coupling reactions.

n is preferably an integer of 0 to 6 and particularly preferably an integer of 1 to 4.

The compound represented by General Formula (1) is preferably a compound represented by General Formula (1-1) or (1-2) and more preferably a compound represented by General Formula (1-1).

General Formula (1-1)

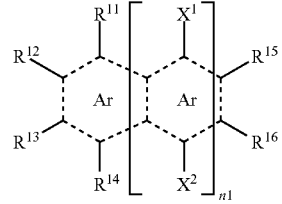

General Formula (1-2)

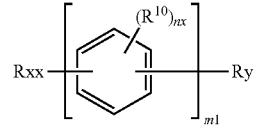

In General Formula (1-1), Ar, $R^{11}$ to $R^{16}$, $X^1$, and $X^2$ are the same as Ar, $R^{11}$ to $R^{16}$, $X^1$, and $X^2$ in General Formula (1), and preferred ranges thereof are also identical. n1 represents an integer of 1 or more. Here, in a case in which n1 is one, in $R^{11}$ to $R^{16}$, $X^1$, and $X^2$, at least two groups adjacent to each other are bonded to each other and thus form a benzene ring.

In General Formula (1-2), Rxx is the same as Rxx in General Formula (1), and a preferred range thereof is also identical. $R^{10}$ represents a substituent, and nx represents an integer of 0 to 4. m1 represents an integer of 3 or more. Ry represents a hydrogen atom or a substituent. Here, Rxx and Ry may be bonded to each other.

n1 is preferably an integer of 1 to 6, more preferably an integer of 1 to 3, and particularly preferably 1.

m1 is preferably an integer of 3 to 10, more preferably an integer of 3 to 8, and particularly preferably an integer of 3 to 5.

The compound represented by General Formula (1-1) is more preferably a compound represented by General Formula (1-3).

General Formula (1-3)

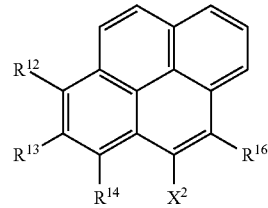

In General Formula (1-3), $R^{12}$ to $R^{14}$, $R^{16}$, and $X^2$ are the same as $R^{12}$ to $R^{14}$, $R^{16}$, and $X^2$ in General Formula (1), and preferred ranges thereof are also identical.

Among these, $R^{13}$, $R^{14}$, $R^{16}$, and $X^2$ are more preferably a hydrogen atom, and $R^{12}$ is more preferably an alkyl group having a carboxy group.

Specific examples of the ring structure in the compound represented by General Formula (1) include anthracene, phenanthracene, pyrene, tetracene, tetraphene, chrysene, triphenylene, pentacene, pentaphene, perylene, benzo[a]pyrene, coronene, anthanthrene, coranurene, ovalene, graphene, cycloparaphenylene, polyparaphenylene, and cyclophene, and pyrene is preferred. However, the present invention is not limited thereto.

Hereinafter, specific examples of the compound represented by General Formula (1) include pyrenbutanoic acid, but the present invention is not limited thereto.

As the compound represented by General Formula (1), commercially available products can be used.

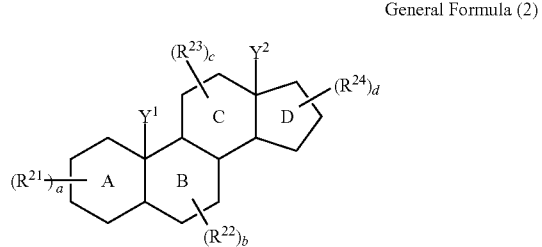

General Formula (2)

In General Formula (2), $Y^1$ and $Y^2$ each independently represent a hydrogen atom, a methyl group, or a formyl group. $R^{21}$, $R^{22}$, $R^{23}$, and $R^{24}$ each independently represent a substituent, and a, b, c, and d represent an integer of 0 to 4.

Here, an A ring may be a saturated ring, an unsaturated ring or aromatic ring having one or two double bonds, a B ring and a C ring may be unsaturated rings having one or two double bonds. Meanwhile, in a case in which each of a, b, c, and d is an integer of 2 to 4, substituents adjacent to each other may be bonded to each other and thus form a ring.

In the present invention, the A ring, the B ring, the C ring, and the D ring are all preferably a saturated ring.

The compound represented by General Formula (2) is a compound having a steroid skeleton.

Here, the carbon numbers in the steroid skeleton are as illustrated below.

Carbon Numbers in Steroid Skeleton

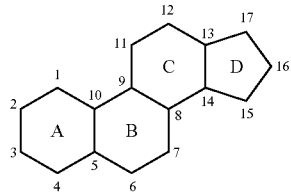

The substituent as $R^{21}$, $R^{22}$, $R^{23}$, and $R^{24}$ may be any substituent, but an alkyl group, an alkenyl group, a hydroxy group, a formyl group, an acyl group, a carboxy group or a salt thereof, a (meth)acrylic group, a (meth)acryloyloxy group, a (meth)acrylamide group, an epoxy group, and an oxetanyl group are preferred, and a =O group in which the same carbon atom is commonly substituted by two substituents is also preferred.

Among these, a hydroxy group and an alkyl group are preferred. Furthermore, the substituent as $R^{21}$, $R^{22}$, and $R^{23}$ is preferably a hydroxy group, and the substituent as $R^{24}$ is preferably an alkyl group.

The alkyl group is preferably an alkyl group having 1 to 12 carbon atoms (preferably 1 to 8 carbon atoms and more preferably 1 to 4 carbon atoms) and may have a substituent.

The substituent may be any substituent, examples thereof include an alkyl group (preferably a methyl group), an alkenyl group, a hydroxy group, a formyl group, an acyl group, a carboxy group, an alkoxycarbonyl group, a carbamoyl group, and a sulfo group, and an alkyl group (preferably a methyl group) and a carboxy group are preferred. The compound also preferably contains an unsaturated carbon bond of a double bond or a triple bond therein as the alkyl group.

The alkenyl group is preferably an alkenyl group having 1 to 12 carbon atoms and may have a substituent. The substituent may be any substituent, examples thereof include an alkyl group, an alkenyl group, a hydroxy group, a formyl group, an acyl group, a carboxy group, an alkoxycarbonyl group, a carbamoyl group, and a sulfo group.

$R^{21}$ preferably substitutes the carbon number 3, $R^{22}$ preferably substitutes the carbon number 6 or 7, $R^{23}$ preferably substitutes the carbon number 12, and $R^{24}$ preferably substitutes the carbon number 17.

$Y^1$ and $Y^2$ are preferably a hydrogen atom or a methyl group and more preferably a methyl group.

a is preferably an integer of 0 to 2 and more preferably 1.

b is preferably an integer of 0 to 2 and more preferably 0.

c is preferably an integer of 0 to 2 and more preferably 1.

d is preferably an integer of 0 to 2 and more preferably 1.

In a case in which the A ring is an unsaturated ring, the double bond is preferably a bond between the carbon numbers 4 and 5; in a case in which the B ring is an unsaturated ring, the double bond is preferably a bond between the carbon numbers 5 and 6 or 6 and 7; in a case in which the C ring is an unsaturated ring, the double bond is preferably a bond between the carbon numbers 8 and 9.

Meanwhile, the compound represented by General Formula (2) also includes any form of the stereoisomer. In a case in which the downward direction from the paper is represented by a, and the upward direction from the paper is represented by β, the bonding direction of the substituent may be any one of α and β or a mixed direction thereof. In addition, the disposition of the A/B rings, the disposition of the B/C rings, and the disposition of the C/D rings may be any one of a trans disposition and a cis disposition or a mixed disposition thereof.

The compound having the steroid skeleton is preferably a steroid as illustrated below.

In the following drawing, substituents having a steroid ring are sterically controlled.

From the left-hand side, cholestanes, cholanes, pregnanes, androstanes, and estranes are illustrated.

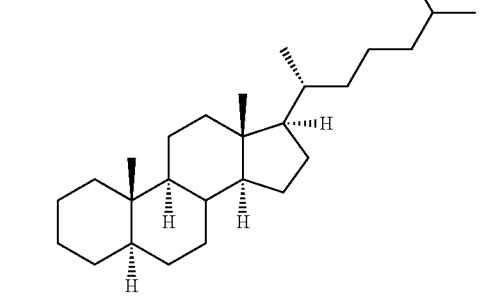

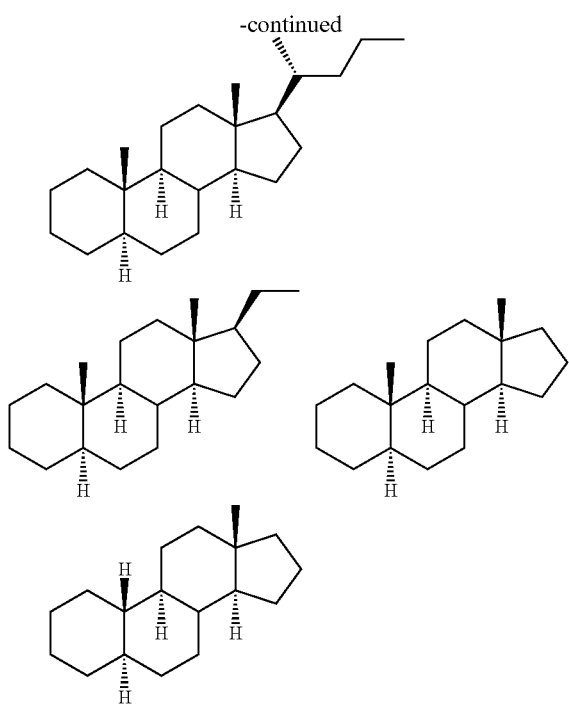

Specific examples of the compound represented by General Formula (2) include cholesterol, ergosterol, testosterone, estradiol, erdosterol, aldosterone, hydrocortisone, stigmasterol, timosterol, lanosterol, 7-dehydrodesostolol, 7-dehydrocholesterol, cholanic acid, cholic acid, lithocholic acid, deoxycholic acid, sodium deoxycholate, lithium deoxycholate, hyodeoxycholic acid, chenodeoxycholic acid, ursodeoxycholic acid, dehydrocholic acid, faucolic acid, and hyocholic acid, and deoxycholic acid is preferred. However, the present invention is not limited thereto.

As the compound represented by General Formula (2), commercially available products can be used.

Group of Functional Groups (II)

A hydroxy group, a thiol group, a carboxy group, a sulfonic acid group, a phosphoric acid group, an amino group, a cyano group, an isocyanate group, an amide group (preferably an amino group having 1 to 10 carbon atoms), an urea group (preferably an urea group having 1 to 10 carbon atoms), an urethane group (preferably an urethane group having 1 to 10 carbon atoms), an imide group (preferably an imide group having 2 to 12 carbon atoms), an isocyanurate group Functional groups belonging to the group of functional groups (II) have a physical and chemical adsorption capability to the surface of the inorganic solid electrolyte, and thus the dendritic polymer that is used in the present invention has a strong binding property to the inorganic solid electrolyte. Additionally, unlike linear polymers, the dendritic polymer has a small occupancy volume of polymer chains, and thus the coating area of the surfaces of individual particles is small, and the conductivity of lithium ions is not easily hindered.

Functional groups belonging to the groups of functional groups (I) and (II) have affinity to both the electrode active materials and the inorganic solid electrolyte.

Dendritic polymers that can be used in the present invention preferably have at least one kind of functional group selected from the group of functional groups (I) and at least one kind of functional group selected from the group of functional groups (II). In the present invention, the above-described aspect will be referred to as "having two or more kinds of functional groups".

Here, "having two or more kinds of functional groups" also includes an aspect in which dendritic polymers have two or more functional groups belonging to both the groups of functional groups (I) and (II) such as a hydroxy group and a thiol group.

Dendritic polymers that can be used in the present invention "have two or more kinds of functional groups" and thus have affinity to the electrode active material and the inorganic solid electrolyte and are capable of increasing the adhesion percentage among solid particles in the all-solid state secondary battery of the present invention produced using the solid electrolyte composition of the present invention. Therefore, in the all-solid state secondary battery of the present invention, favorable interfaces are formed between solid particles, and the binding properties between solid particles and between layers are excellent. Therefore, the all-solid state secondary battery of the present invention is capable of exhibiting excellent ion conductivity even without being pressurized.

The number of molecular terminal portions in dendritic polymers that can be used in the present invention is not particularly limited, but the number of molecular terminal portions in one molecule is preferably 8 to 2,500, more preferably 12 to 500, and particularly preferably 16 to 128.

In a case in which the number of molecular terminal portions is in the above-described range, and the molecular terminal portions have the specific functional groups, the contact probability of adsorption groups (the specific functional groups) to the inorganic solid electrolyte and/or the electrode active materials increases, the adsorption amount falls into an appropriate range, and strong adsorption and bonding can be formed through the dendritic polymer between the inorganic solid electrolyte and the electrode active materials.

The number-average molecular weight of dendritic polymers that can be used in the present invention is not particularly limited, but is preferably 500 to 500,000, more preferably 700 to 100,000, and particularly preferably 800 to 30,000.

In a case in which the number-average molecular weight is in the above-described range, both the binding property and the ion conductivity can be improved.

Meanwhile, the number-average molecular weight of dendritic polymers can be measured with reference to a measurement method described in the section of examples.

The average particle diameter (volume-average particle diameter) of dendritic polymers that can be used in the present invention is not particularly limited, but is preferably 1 nm to 1,000 nm, more preferably 1 nm to 100 nm, and particularly preferably 1 nm to 50 nm.

In a case in which the average particle diameter is in the above-described range, both the binding property and the ion conductivity can be improved.

Meanwhile, the average particle diameter of dendritic polymers can be measured with reference to a measurement method described in the section of examples.

Dendritic polymers that can be used in the present invention preferably have a polymeric arm portion extending from a molecular terminal portion. Dendritic polymers preferably have, subsequent to the arm portion, a chain-like polymer which has a number-average molecular weight of 1,000 or more and has at least one substituent selected from a group of substituents (a) (hereinafter, in some cases, also referred to as "specific substituent"). Dendritic polymers that can be used in the present invention may have the specific substituent in any portions of the arm portions and preferably have the specific substituent in a terminal.

Dendritic polymers preferably have a substituent belonging to the group of substituents (a) since the dispersion stability of the solid electrolyte composition of the present invention improves.

The number-average molecular weight of the chain-like polymer is preferably 500 or more and more preferably 1,000 or more. The upper limit is not particularly limited, but is preferably 100,000 or less and more preferably 30,000 or less.

The molecular weight of the dendritic polymer per the specific functional group, the specific substituent, or the arm portion is not particularly limited, but is preferably 50 to 10,000, more preferably 100 to 5,000, and particularly preferably 200 to 1,000.

The ratio among (the number of) the specific functional groups, (the number of) the specific substituents, and (the number of) the arm portions ((the number of) the specific functional groups/(the number of) the specific substituents/(the number of) the arm portions) is preferably 2 to 100/0 to 100/0 to 100, more preferably 10 to 80/10 to 80/0 to 50, and particularly preferably 30 to 70/30 to 70/0 to 20.

Dendritic polymers that can be used in the present invention have the specific functional groups, the specific substituents, and/or the arm portions in preferably 1% to 100%, more preferably 50% to 100%, and particularly preferably 70% to 100% of the total number of molecular terminal portions.

The ratio among (the number of) the specific functional groups, (the number of) the specific substituents, and (the number of) the arm portions all of which have molecular terminal portions ((the number of) the specific functional groups having molecular terminal portions/(the number of) the specific substituents having molecular terminal portions/(the number of) the arm portions) having molecular terminal portions is preferably 2 to 100/0 to 100/0 to 100, more preferably 10 to 80/10 to 80/0 to 50, and particularly preferably 30 to 70/30 to 70/0 to 20.

The specific functional groups and/or the specific substituents are provided in preferably 1% to 100%, more preferably 50% to 100%, and particularly preferably 70% to 100% of the arm portions.

<Group of Substituents (a)>

An alkyl group having 8 or more carbon atoms, an alkenyl group having 8 or more carbon atoms, an alkynyl group having 8 or more carbon atoms, and a polyether group, a polycarbonate group, a polyester group, and a polysiloxane group all of which have a number-average molecular weight of 300 or more.

The alkyl group in the group of substituents (a) may be linear or branched. The upper limit of the number of carbon atoms in the alkyl group in the group of substituents (a) is not particularly limited, but is preferably 100 or less, more preferably 50 or less, and particularly preferably 30 or less. Specific examples thereof include octyl, dodecyl, heptadecyl, nonadecyl, triacontyl, and stearyl. Meanwhile, the dendritic polymer may contain an unsaturated carbon bond of a double bond or a triple bond therein as the alkyl group.

The alkenyl group in the group of substituents (a) may be linear or branched. The upper limit of the number of carbon atoms in the alkenyl group in the group of substituents (a) is not particularly limited, but is preferably 50 or less, more preferably 40 or less, and particularly preferably 30 or less. Specific examples thereof include octenyl, dodecenyl, heptadecenyl, nonadecenyl, and triacontenyl.

The alkynyl group in the group of substituents (a) may be linear or branched. The upper limit of the number of carbon atoms in the alkynyl group in the group of substituents (a) is not particularly limited, but is preferably 50 or less, more preferably 40 or less, and particularly preferably 30 or less. Specific examples thereof include octyl, dodecyl, heptadecyl, nonadecyl, and triacontinyl.

The upper limit of the number-average molecular weight of the polyether group, the polycarbonate group, the polyester group, and the polysiloxane group having a number-average molecular weight of 300 or more is not particularly limited, but is preferably 100,000 or less, more preferably 50,000 or less, and particularly preferably 30,000 or less.

Here, the polyether group refers to a monovalent group having two or more ether bonds. The polycarbonate group refers to a monovalent group having two or more carbonate bonds. The pooester group refers to a monovalent group having two or more ester bonds. The polysiloxane group refers to a monovalent group having two or more siloxane bonds.

Hereinafter, examples of dendritic polymers that can be preferably used in the present invention [Exemplary Compounds (A-1) to (A-24)] will be described, but the present invention is not limited thereto.

Meanwhile, in Table 1, for example, Exemplary Compound A-1 indicates that the dendritic polymer raw material is the dendritic polymer that is used in the present invention.

In addition, for example, Exemplary Compound A-4 indicates that the dendritic polymer raw material (a polyamidoamine dendrimer, ethylenediamine core, generation 3.0 (Catalog No. 412422)) is the dendritic polymer that is used in the present invention in which 16 out of 32 amino groups that are molecular terminal portions react with a carboxy group in a linolenic acid and 16 specific substituents are introduced.

TABLE 1

| Exemplary Compound | Kind | Dendritic polymer raw material | Molecular terminal portion | Specific functional group and/or specific substituent | Molecular weight Mn | Particle diameter nm |
|---|---|---|---|---|---|---|
| A-1 | Dendron | 686670 | OH(8), COOH(1) | None | 830 | 1.5 |
| A-2 | Dendron | 686654 | OH(32), COOH(1) | None | 3,620 | 2.6 |
| A-3 | Dendrimer (generation 3) | 412422 | $NH_2$(32) | None | 6,900 | 3.5 |
| A-4 | Dendrimer (generation 3) | 412422 | $NH_2$(16) | Linolenic acid-modified (16) | 7,300 | 3.8 |
| A-5 | Dendrimer (generation 4) | 412449 | $NH_2$(64) | None | 14,200 | 4.4 |
| A-6 | Dendrimer (generation 4) | 412449 | $NH_2$(16) | Eleostearic acid-modified (48) | 16,200 | 4.6 |

TABLE 1-continued

| Exemplary Compound | Kind | Dendritic polymer raw material | Molecular terminal portion | Specific functional group and/or specific substituent | Molecular weight Mn | Particle diameter nm |
|---|---|---|---|---|---|---|
| A-7 | Hyperbranched (generation 2) | 686603 | OH(16) | None | 1,700 | 2.0 |
| A-8 | Hyperbranched (generation 2) | 686603 | OH(0) | Succinic acid-modified (8), linolenic acid-modified (8) | 2,300 | 2.0 |
| A-9 | Hyperbranched (generation 2) | 686603 | OH(0) | Deoxycholic acid-modified (8), linolenic acid-modified (8) | 2,600 | 2.1 |
| A-10 | Hyperbranched (generation 3) | 686581 | OH(32) | None | 3,600 | 2.5 |
| A-11 | Hyperbranched (generation 3) | 686581 | OH(16) | Stearic acid-modified (16) | 4,000 | 2.9 |
| A-12 | Hyperbranched (generation 3) | 686581 | OH(16) | Linolenic acid-modified (16) | 4,000 | 3.0 |
| A-13 | Hyperbranched (generation 3) | 686581 | OH(0) | Succinic acid-modified (16), linolenic acid-modified (16) | 3,700 | 3.0 |
| A-14 | Hyperbranched (generation 4) | 686573 | OH(64) | None | 7,300 | 3.9 |
| A-15 | Hyperbranched (generation 4) | 686573 | OH(32) | Linolenic acid-modified (32) | 8,000 | 3.7 |
| A-16 | Hyperbranched (generation 4) | 686573 | OH(0) | Succinic acid-modified (16), linolenic acid-modified (48) | 8,200 | 3.8 |
| A-17 | Hyperbranched (generation 4) | 686573 | OH(0) | Deoxycholic acid-modified (16), linolenic acid-modified (48) | 8,500 | 3.9 |
| A-18 | Hyperbranched (generation 4) | 686573 | OH(0) | Pyrenebutanoic acid-modified (16), linolenic acid-modified (48) | 8,300 | 3.9 |
| A-19 | Hyperbranched (generation 4) | 686573 | OH(32) | P1-modified (32) | 23,100 | 5.0 |
| A-20 | Hyperbranched (generation 4) | 686573 | OH(32) | P2-modified (32) | 25,200 | 5.1 |
| A-21 | Hyperbranched (generation 4) | 686573 | OH(0) | Succinic acid-modified (32), P3-modified (32) | 31,400 | 5.7 |
| A-22 | Hyperbranched (generation 4) | 686573 | OH(0) | Succinic acid-modified (16), P4-modified (48) | 43,200 | 7.2 |
| A-23 | Hyperbranched (generation 4) | 686573 | OH(0) | Succinic acid-modified (48), P5-modified (16) | 19,700 | 4.3 |
| A-24 | Hyperbranched (generation 4) | 686573 | OH(32) | P6-modified (16) | 35,000 | 6.0 |

<Notes of Table>

The numbers of the dendritic polymers indicate catalog numbers of Aldrich-Sigma, Co. LLC.

The number-average molecular weight is abbreviated as "molecular weight", and the average particle diameter is abbreviated as "particle diameter".

The numerical values in parentheses for the molecular terminal portions indicate the number of functional groups which are the molecular terminal portions in the dendritic polymer after the introduction of the specific functional groups and/or the specific substituents.

The numerical values in parentheses for the specific functional groups and/or the specific substituents indicate the number of the specific functional groups and/or the specific substituents.

Linolenic acid: α-Linolenic acid

Eleostearic acid: α-Eleostearic acid

The structures of P1 to P6 will be illustrated below. Hereinafter, n represents the number of repeating units. Mw represents the number-average molecular weight.

P1

(Mw 3000)

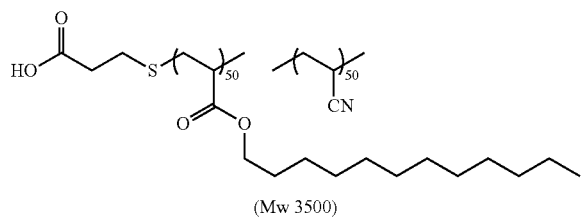

(Mw 3500)

P3

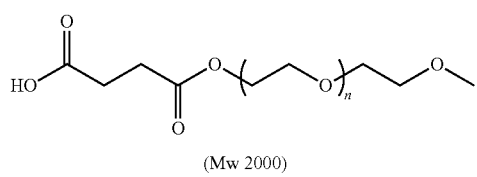

(Mw 2000)

P4

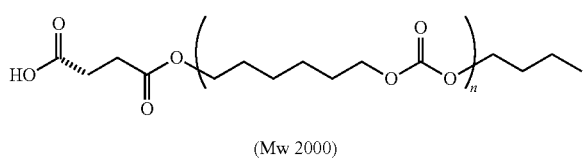

(Mw 2000)

P5

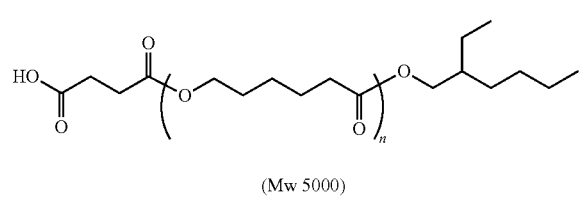

(Mw 5000)

P6

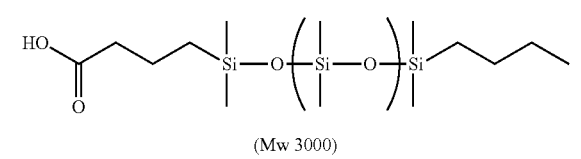

(Mw 3000)

One kind of the dendritic polymer may be used singly or two or more kinds thereof may be used in combination, but one kind thereof is preferably used.

The content of the dendritic polymer is preferably 0.01 to 20 parts by mass, more preferably 0.2 to 10 parts by mass, still more preferably 0.3 to 5 parts by mass, and particularly preferably 0.5 to 3 parts by mass with respect to 100 parts by mass of the inorganic solid electrolyte.

The content thereof is preferably in the above-described preferred range since it is possible to enhance the binding property of solid interfaces without impairing the conduction of ions.

In the present invention, the mass ratio of the total mass of the inorganic solid electrolyte and the electrode active materials that are added as necessary to the mass of the dendritic polymer [(the mass of the inorganic solid electrolyte+the mass of the electrode active materials)/(the mass of the dendritic polymer)] is preferably in a range of 1,000 to 1. Furthermore, this ratio is more preferably 500 to 2, and still more preferably 100 to 10.

(Inorganic Solid Electrolyte)

The inorganic solid electrolyte is an inorganic solid electrolyte, and the solid electrolyte refers to a solid-form electrolyte capable of migrating ions therein. The inorganic solid electrolyte is clearly differentiated from organic solid electrolytes (macromolecular electrolytes represented by PEO or the like and organic electrolyte salts represented by LiTFSI) since the inorganic solid electrolyte does not include any organic substances as a principal ion-conductive material. In addition, the inorganic solid electrolyte is a solid in a static state and is thus, generally, not disassociated or liberated into cations and anions. Due to this fact, the inorganic solid electrolyte is also clearly differentiated from inorganic electrolyte salts of which cations and anions are disassociated or liberated in electrolytic solutions or polymers ($LiPF_6$, $LiBF_4$, LiFSI, LiCl, and the like). The inorganic solid electrolyte is not particularly limited as long as the inorganic solid electrolyte has ion conductivity of ions of metals belonging to Group I or II of the periodic table (hereinafter, also referred to as the ion conductivity of metal) and is generally a substance not having electron conductivity.

In the present invention, the inorganic solid electrolyte has ion conductivity of ions of metals belonging to Group I or II of the periodic table. As the inorganic solid electrolyte, it is possible to appropriately select and use solid electrolyte materials that are applied to this kind of products. Typical examples of the inorganic solid electrolyte include (i) sulfide-based inorganic solid electrolytes and (ii) oxide-based inorganic solid electrolytes.

(i) Sulfide-Based Inorganic Solid Electrolytes

Sulfide-based inorganic solid electrolytes are preferably inorganic solid electrolytes which contain sulfur atoms (S), have ion conductivity of metals belonging to Group I or II of the periodic table, and have electron-insulating properties. The sulfide-based inorganic solid electrolytes are preferably inorganic solid electrolytes which, as elements, contain at least Li, S, and P and have a lithium ion conductivity, but the sulfide-based inorganic solid electrolytes may also include elements other than Li, S, and P depending on the purposes or cases.

Examples thereof include lithium ion-conductive inorganic solid electrolytes satisfying a composition represented by Formula (A).

$$L_{a1}M_{b1}P_{c1}S_{d1}A_{e1} \tag{A}$$

(In the formula, L represents an element selected from Li, Na, and K and is preferably Li. M represents an element selected from B, Zn, Sn, Si, Cu, Ga, Sb, Al, and Ge. Among these, B, Sn, Si, Al, and Ge are preferred, and Sn, Al, and Ge are more preferred. A represents I, Br, Cl, and F and is preferably I or Br and particularly preferably I. a1 to e1 represent the compositional ratios among the respective elements, and a1:b1:c1:d1:e1 satisfies 1 to 12:0 to 1:1:2 to 12:0 to 5. Furthermore, a1 is preferably 1 to 9 and more preferably 1.5 to 4. b1 is preferably 0 to 0.5. Furthermore, d1 is preferably 3 to 7 and more preferably 3.25 to 4.5. Furthermore, e1 is preferably 0 to 3 and more preferably 0 to 1.)

In Formula (A), the compositional ratios among L, M, P, S, and A are preferably b1=0 and e1=0, more preferably b1=0, e1=0, and the ratio among a1, c1, and d1 (a1:c1:d1)=1 to 9:1:3 to 7, and still more preferably b1=0, e1=0, and a1:c1:d1=1.5 to 4:1:3.25 to 4.5. The compositional ratios among the respective elements can be controlled by adjusting the amounts of raw material compounds blended to manufacture the sulfide-based solid electrolyte as described below.

The sulfide-based inorganic solid electrolytes may be non-crystalline (glass) or crystallized (made into glass ceramic) or may be only partially crystallized. For example, it is possible to use Li—P—S-based glass containing Li, P, and S or Li—P—S-based glass ceramic containing Li, P, and S.

The sulfide-based inorganic solid electrolytes can be manufactured by a reaction of [1] lithium sulfide ($Li_2S$) and phosphorus sulfide (for example, diphosphorus pentasulfide ($P_2S_5$)), [2] lithium sulfide and at least one of a phosphorus single body or a sulfur single body, or [3] lithium sulfide, phosphorus sulfide (for example, diphosphorus pentasulfide ($P_2S_5$)), and at least one of a phosphorus single body or a sulfur single body.

The ratio between $Li_2S$ and $P_2S_5$ in Li—P—S-based glass and Li—P—S-based glass ceramic is preferably 65:35 to 85:15 and more preferably 68:32 to 77:23 in terms of the molar ratio between $Li_2S:P_2S_5$. In a case in which the ratio between $Li_2S$ and $P_2S_5$ is set in the above-described range, it is possible to increase the lithium ion conductivity. Specifically, the lithium ion conductivity can be preferably set to $1 \times 10^{-4}$ S/cm or more and more preferably set to $1 \times 10^{-3}$ S/cm or more. The upper limit is not particularly limited, but realistically $1 \times 10^{-1}$ S/cm or less.

Specific examples of the compound include compounds formed using a raw material composition containing, for example, $Li_2S$ and a sulfide of an element of Groups XIII to XV. Specific examples thereof include $Li_2S$—$P_2S_5$, $Li_2S$—LiI—$P_2S_5$, $Li_2S$—LiI—$Li_2O$—$P_2S_5$, $Li_2S$—LiBr—$P_2S_5$, $Li_2S$—$Li_2O$—$P_2S_5$, $Li_2S$—$Li_3PO_4$—$P_2S_5$, $Li_2S$—$P_2S_5$—$P_2O_5$, $Li_2S$—$P_2S_5$—$SiS_2$, $Li_2S$—$P_2S_5$—SnS, $Li_2S$—$P_2S_5$—$Al_2S_3$, $Li_2S$—$GeS_2$, $Li_2S$—$GeS_2$—ZnS, $Li_2S$—$Ga_2S_3$, $Li_2S$—$GeS_2$—$Ga_2S_3$, $Li_2S$—$GeS_2$—$Sb_2S_5$, $Li_2S$—$GeS_2$—$Al_2S_3$, $Li_2S$—$SiS_2$, $Li_2S$—$Al_2S_3$, $Li_2S$—$SiS_2$—$Al_2S_3$, $Li_2S$—$SiS_2$—$P_2S_5$, $Li_2S$—$SiS_2$—$P_2S_5$—LiI, $Li_2S$—$SiS_2$—LiI, $Li_2S$—$SiS_2$—$Li_4SiO_4$, $Li_2S$—$SiS_2$—$Li_3PO_4$, $Li_{10}GeP_2S_{12}$, and the like. Among these, crystalline and/or amorphous raw material compositions consisting of $Li_2S$—$P_2S_5$, $Li_2S$—$GeS_2$—$Ga_2S_3$, $Li_2S$—$SiS_2$—$P_2S_5$, $Li_2S$—$SiS_2$—$Li_3PO_4$, $Li_2S$—LiI—$Li_2O$—$P_2S_5$, $Li_2S$—$Li_2O$—$P_2S_5$, $Li_2S$—$Li_3PO_4$—$P_2S_5$, $Li_2S$—$GeS_2P_2S_5$, and $Li_{10}GeP_2S_{12}$ are preferred due to their high lithium ion conductivity. Examples of a method for synthesizing sulfide-based inorganic solid electrolyte materials using the above-described raw material compositions include an amorphization method. Examples of the amorphization method include a mechanical milling method and a melting quenching method. Among these, the mechanical milling method is preferred. This is because treatments at normal temperature become possible, and it is possible to simplify manufacturing steps.

(ii) Oxide-Based Inorganic Solid Electrolytes

Oxide-based inorganic solid electrolytes are preferably compounds which contain oxygen atoms (O), have an ion conductivity of metals belonging to Group I or II of the periodic table, and have electron-insulating properties.

Specific examples of the compounds include $Li_{xa}La_{ya}TiO_3$ [xa=0.3 to 0.7 and ya=0.3 to 0.7] (LLT), $Li_{xb}La_{yb}Zr_{zb}M^{bb}_{mb}O_{nb}$ ($M^{bb}$ is at least one element of Al, Mg, Ca, Sr, V, Nb, Ta, Ti, Ge, In and Sn, xb satisfies 5≤xb≤10, yb satisfies 1≤yb≤4, zb satisfies 1≤zb≤4, mb satisfies 0≤mb≤2, and nb satisfies 5≤nb≤20.), $Li_{xc}B_{yc}M^{cc}_{zc}O_{nc}$ ($M^{cc}$ at least one element of C, S, Al, Si, Ga, Ge, In, and Sn, xc satisfies 0≤xc≤5, yc satisfies 0≤yc≤1, zc satisfies 0≤zc≤1, and nc satisfies 0≤nc≤6), $Li_{xd}(Al, Ga)_{yd}(Ti, Ge)_{zd}Si_{ad}P_{md}O_{nd}$ (1≤xd≤3, 0≤yd≤1, 0≤zd≤2, 0≤ad≤1, 1≤md≤7, 3≤nd≤13), $Li_{(3-2xe)}M^{ee}_{xe}D^{ee}O$ (xe represents a number of 0 or more and 0.1 or less, and $M^{ee}$ represents a divalent metal atom. $D^{ee}$ represents a halogen atom or a combination of two or more halogen atoms.), $Li_{xf}Si_{yf}O_{zf}$ (1≤xf≤5, 0≤yf≤3, 1≤zf≤10), $Li_{xg}S_{yg}O_{zg}$ (1≤xg≤3, 0≤yg≤2, 1zg≤10), $Li_3BO_3$—$Li_2SO_4$, $Li_2O$—$B_2O_3$—$P_2O_5$, $Li_2O$—$SiO_2$, $Li_6BaLa_2Ta_2O_{12}$, $Li_3PO_{(4-3/2w)}N_w$ (w satisfies w<1), $Li_{3.5}Zn_{0.25}GeO_4$ having a lithium super ionic conductor (LISICON)-type crystal structure, $La_{0.55}Li_{0.35}TiO_3$ having a perovskite-type crystal structure, $LiTi_2P_3O_{12}$ having a natrium super ionic conductor (NASICON)-type crystal structure, $Li_{1+xh+yh}(Al, Ga)_{xh}(Ti, Ge)_{2-xh}Si_{yh}P_{3-yh}O_{12}$ (0≤xh≤1, 0≤yh≤1), $Li_7La_3Zr_2O_{12}$ (LLZ) having a garnet-type crystal structure. In addition, phosphorus compounds containing Li, P and O are also desirable. Examples thereof include lithium phosphate ($Li_3PO_4$), LiPON in which some of oxygen atoms in lithium phosphate are substituted with nitrogen, $LiPOD^1$ ($D^1$ is at least one selected from Ti, V, Cr, Mn, Fe, Co, Ni, Cu, Zr, Nb, Mo, Ru, Ag, Ta, W, Pt, Au, and the like), and the like. It is also possible to preferably use $LiA^1ON$ ($A^1$ represents at least one selected from Si, B, Ge, Al, C, Ga, and the like) and the like.

In the present invention, the inorganic solid electrolyte having ion conductivity of metals belonging to Group I or II of the periodic table is preferably a sulfide-based inorganic solid electrolyte since the sulfide-based inorganic solid electrolyte has a high ion conductivity that affects the resistance of the battery and can be more easily processed due to the flexibility of the particles.

The shape of the inorganic solid electrolyte is not particularly limited, but preferably particulate.

The volume-average particle diameter of the inorganic solid electrolyte is not particularly limited, but is preferably 0.01 μm or more and more preferably 0.1 μm or more. The upper limit is preferably 100 μm or less and more preferably 50 μm or less. Meanwhile, the volume-average particle diameter of the inorganic solid electrolyte particles is measured in the following order. One percent by mass of a dispersion liquid is diluted and prepared using the inorganic solid electrolyte particles and water (heptane in a case in which the inorganic solid electrolyte is unstable in water) in a 20 ml sample bottle. The diluted dispersion specimen is irradiated with 1 kHz ultrasonic waves for 10 minutes and is then immediately used for testing. Data capturing is carried out 50 times using this dispersion liquid specimen, a laser diffraction/scattering-type particle size distribution measurement instrument LA-920 (trade name, manufactured by Horiba Ltd.), and a silica cell for measurement at a temperature of 25° C., thereby obtaining the volume-average particle diameter. Regarding other detailed conditions and the like, the description of JIS Z8828:2013 "Particle size analysis-Dynamic light scattering method" is referred to as necessary. Five specimens are produced per level, and the average values thereof are employed.

When the satisfaction of both the battery performance and the interface resistance-reducing and maintaining effect is taken into account, the concentration of the inorganic solid electrolyte in the solid component of the solid electrolyte composition is preferably 5% by mass or more, more preferably 10% by mass or more, and particularly preferably 20% by mass or more with respect to 100% by mass of the solid components. From the same viewpoint, the upper limit is preferably 99.9% by mass or less, more preferably 99.5% by mass or less, and particularly preferably 99% by mass or less.

Meanwhile, in the present specification, solid components refer to components that do not disappear due to volatilization or evaporation in the case of being dried at 170° C. for six hours and typically indicate components other than a dispersion medium described below.

These inorganic solid electrolytes may be used singly or two or more inorganic solid electrolytes may be used in combination.

(Binder)

The solid electrolyte composition of the present invention also preferably contains a binder. Binders that can be used in the present invention are not particularly limited as long as the binders are organic polymers.

The binder that can be used in the present invention is preferably a binder that is generally used as binding agents for positive electrodes or negative electrodes of battery materials, is not particularly limited, and is preferably, for example, a binder consisting of resins described below.

Examples of fluorine-containing resins include polytetrafluoroethylene (PTFE), polyvinylene difluoride (PVdF), and copolymers of polyvinylene difluoride and hexafluoropropylene (PVdF-HFP).

Examples of hydrocarbon-based thermoplastic resins include polyethylene, polypropylene, styrene butadiene rubber (SBR), hydrogenated styrene butadiene rubber (H SBR), butylene rubber, acrylonitrile butadiene rubber, polybutadiene, polyisoprene, polyisoprene latex, and the like.

Examples of acrylic resins include polymethyl (meth)acrylate, polyethyl (meth)acrylate, polyisopropyl (meth)acrylate, polyisobutyl (meth)acrylate, polybutyl (meth)acrylate, polyhexyl (meth)acrylate, polyoctyl (meth)acrylate, polydodecyl (meth)acrylate, polystearyl (meth)acrylate, poly 2-hydroxyethyl (meth)acrylate, poly(meth)acrylate, polybenzyl (meth)acrylate, polyglycidyl (meth)acrylate, polydimethylaminopropyl (meth)acrylate, and copolymers of monomers constituting the above-described resins.

Examples of urethane resins include polyurethane.

In addition, copolymers with other vinyl-based monomers are also preferably used. Examples thereof include polymethyl (meth)acrylate-polystyrene copolymers, polymethyl (meth)acrylate-acrylonitrile copolymers, polybutyl (meth)acrylate-acrylonitrile-styrene copolymers, and the like.

These binders may be used singly or two or more binders may be used in combination.

The binder that can be used in the present invention is preferably polymer particles, and the average particle diameter $\phi$ of the polymer particles is preferably 0.01 μm to 100 μm, more preferably 0.05 μm to 50 μm, and still more preferably 0.05 μm to 20 μm. The average particle diameter $\phi$ is preferably in the preferred range described above from the viewpoint of improvement in output density.

The average particle diameter $\phi$ of the polymer particles that can be used in the present invention is not particularly limited and refers to an average particle diameter according to the following measurement conditions and definition.

One percent by mass of a dispersion liquid is prepared using the polymer particles and an arbitrary solvent (an organic solvent that is used to prepare the solid electrolyte composition, for example, heptane) in a 20 ml sample bottle. The diluted dispersion specimen is irradiated with 1 kHz ultrasonic waves for 10 minutes and then immediately used for testing. Data capturing is carried out 50 times using this dispersion liquid specimen, a laser diffraction/scattering-type particle size distribution measurement instrument LA-920 (trade name, manufactured by Horiba Ltd.), and a silica cell for measurement at a temperature of 25° C., and the obtained volume-average particle diameter is considered as the average particle diameter $\phi$. Regarding other detailed conditions and the like, the description of JIS Z8828:2013 "Particle size analysis-Dynamic light scattering method" is referred to as necessary. Five specimens are produced per level, and the average values thereof are employed.

Meanwhile, the average particle diameter $\phi$ can be measured from the produced all-solid state secondary battery by, for example, disassembling the battery, peeling the electrodes, measuring the average particle diameters of the electrode materials according to the above-described method for measuring the average particle diameter of the polymer particles, and subtracting the measurement value of the average particle diameter of particles other than the polymer particles which has been measured in advance.

The structure of the polymer particles is not particularly limited as long as the polymer particles are organic polymer particles. Examples of resins constituting the organic polymer particles include the resins described as the resins constituting the binder, and the preferred resins are also applicable.

The shape of the polymer particles is not limited as long as the polymer particles maintain a solid form. The polymer particles may be mono-dispersed or poly-dispersed. The polymer particles may have a truly spherical shape or a flat shape and, furthermore, may have an irregular shape. The surfaces of the polymer particles may form a flat shape or an uneven shape. The polymer particles may have a core-shell structure, and the core (inner core) and the shell (outer shell) may be constituted of the same material or different materials. In addition, the polymer particles may be hollow particles, and the porosity is not limited.

The polymer particles can be synthesized using a method in which monomer particles are polymerized in the presence of a surfactant, an emulsifier, or a dispersant or a method in which the polymer particles are precipitated in a crystalline shape as the molecular weight increases.

In addition, an existing method in which polymers are mechanically crushed or a method in which a polymer solution is reprecipitated into a fine particle shape may also be used.

The polymer particles may be commercially available products or the oily latex-shape polymer particles described in JP2015-88486A and WO2015/046314A.

Regarding the glass transition temperature of the binder, the upper limit is preferably 50° C. or lower, more preferably 0° C. or lower, and most preferably −20° C. or lower. The lower limit is preferably −100° C. or higher, more preferably −70° C. or higher, and most preferably −50° C. or higher.

The glass transition temperature (Tg) is measured using a dried specimen and a differential scanning calorimeter "X-DSC7000" (trade name, SII•NanoTechnology Inc.) under the following conditions. The glass transition temperature of the same specimen is measured twice, and the measurement result of the second measurement is employed.

Atmosphere of the measurement chamber: Nitrogen (50 mL/min)

Temperature-increase rate: 5° C./min

Measurement-start temperature: −100° C.

Measurement-end temperature: 200° C.

Specimen pan: Aluminum pan

Mass of the measurement specimen: 5 mg

Calculation of Tg: Tg is calculated by rounding off the middle temperature between the declination-start point and the declination-end point in the DSC chart to the integer.

The polymer (preferably the polymer particles) constituting the binder that can be used in the present invention preferably has a moisture concentration of 100 ppm or less (mass-based) and Tg of 100° C. or lower.

In addition, the polymer constituting the binder that can be used in the present invention may be dried by being crystallized or may be used in a polymer solution form. The amount of a metal-based catalyst (tin, titanium, or bismuth catalyst which is an urethanization or polyesterification catalyst) is preferably small. The concentration of metal in copolymers is preferably set to 100 ppm or less (mass-based) by decreasing the amount of the metal during polymerization or removing the catalyst by means of crystallization.

Meanwhile, the moisture concentration of the polymer can be measured using the same method as the method for measuring the moisture content of a solid electrolyte composition described below.

The solvent that is used for the polymerization reaction of the polymer is not particularly limited. Meanwhile, solvents that do not react with the inorganic solid electrolyte or the active materials and furthermore do not decompose the inorganic solid electrolyte or the active materials are desirably used. For example, it is possible to use hydrocarbon-based solvents (toluene, heptane, and xylene), ester-based solvents (ethyl acetate and propylene glycol monomethyl ether acetate), ether-based solvents (tetrahydrofuran, dioxane, and 1,2-diethoxyethane), ketone-based solvents (acetone, methyl ethyl ketone, and cyclohexanone), nitrile-based solvents (acetonitrile, propionitrile, butyronitrile, and isobutyronitrile), and halogen-based solvents (dichloromethane and chloroform).

The mass average molecular weight of the polymer constituting the binder that can be used in the present invention is preferably 10,000 or more, more preferably 20,000 or more, and still more preferably 50,000 or more. The upper limit is preferably 1,000,000 or less, more preferably 200,000 or less, and still more preferably 100,000 or less.

In the present invention, the molecular weight of the polymer refers to the mass average molecular weight unless particularly otherwise described. The mass average molecular weight can be measured as the polystyrene-equivalent molecular weight by means of GPC. At this time, the polystyrene-equivalent molecular weight is detected as RI using a GPC apparatus IILC-8220 (trade name, manufactured by Tosoh Corporation) and G3000HXL+G2000HXL (trade name, manufactured by Tosoh Corporation) as columns at a flow rate at 23° C. of 1 mL/min. An eluent can be selected from tetrahydrofuran (THF), chloroform, N-methyl-2-pyrrolidone (NMP), and m-cresol/chloroform (manufactured by Shonanwako Junyaku), and THF is used in a case in which the polymer needs to be dissolved.

In a case in which favorable interface resistance-reducing and maintaining properties are taken into account when the binder is used in all-solid state secondary batteries, the concentration of the binder in the solid electrolyte composition is preferably 0.01% by mass or more, more preferably 0.1% by mass or more, and still more preferably 1% by mass or more with respect to 100% by mass of the solid components. From the viewpoint of battery characteristics, the upper limit is preferably 10% by mass or less, more preferably 5% by mass or less, and still more preferably 3.5% by mass or less.

In the present invention, the mass ratio [(the mass of the inorganic solid electrolyte and the mass of the electrode active materials)/the mass of the binder] of the total mass of the inorganic solid electrolyte and the electrode active materials that are added as necessary to the mass of the binder is preferably in a range of 1,000 to 1. This ratio is more preferably 500 to 2 and still more preferably 100 to 10.

(Lithium Salt)

The solid electrolyte composition of the present invention also preferably contains a lithium salt.

The lithium salt is preferably a lithium salt that is ordinarily used in this kind of products and is not particularly limited. Examples thereof include LiTFSI and the lithium salts described in paragraphs 0082 to 0085 of JP2015-088486A. In the present invention, LiTFSI is preferably used.

The content of the lithium salt is preferably 0 parts by mass or more and more preferably 5 parts by mass or more with respect to 100 parts by mass of the solid electrolyte. The upper limit is preferably 50 parts by mass or less and more preferably 20 parts by mass or less.

(Auxiliary Conductive Agent)

The solid electrolyte composition of the present invention also preferably contains an auxiliary conductive agent. As the auxiliary conductive agent, auxiliary conductive agents that are known as ordinary auxiliary conductive agents can be used. The auxiliary conductive agent may be, for example, graphite such as natural graphite or artificial graphite, carbon black such as acetylene black, Ketjen black, or furnace black, irregular carbon such as needle cokes, a carbon fiber such as a vapor-grown carbon fiber or a carbon nanotube, or a carbonaceous material such as graphene or fullerene and also may be metal powder or a metal fiber of copper, nickel, or the like, and a conductive macromolecule such as polyaniline, polypyrrole, polythiophene, polyacetylene, or a polyphenylene derivative may also be used. In addition, these auxiliary conductive agents may be used singly or two or more auxiliary conductive agents may be used.

(Positive Electrode Active Material)

Next, a positive electrode active material that is used in the solid electrolyte composition for forming the positive electrode active material layer in the all-solid state secondary battery of the present invention (hereinafter, also referred to as the composition for a positive electrode) will be described. The positive electrode active material is preferably a positive electrode active material capable of reversibly intercalating and deintercalating lithium ions. The above-described material is not particularly limited and may be transition metal oxides, elements capable of being complexed with lithium such as sulfur, or the like. Among these, transition metal oxides are preferably used, and the transition metal oxides more preferably have one or more elements selected from Co, Ni, Fe, Mn, Cu, and V as transition metal.

Specific examples of the transition metal oxides include transition metal compounds having a bedded salt-type structure (MA), transition metal oxides having a spinel-type structure (MB), lithium-containing transition metal phosphoric acid compounds (MC), lithium-containing transition metal halogenated phosphoric acid compounds (MD), lithium-containing transition metal silicate compounds (ME), and the like.

Specific examples of the transition metal oxides having a bedded salt-type structure (MA) include $LiCoO_2$ (lithium cobalt oxide [LCO]), $LiNi_2O_2$ (lithium nickelate), $LiNi_{0.85}Co_{0.10}Al_{0.05}O_2$ (lithium nickel cobalt aluminum oxide [NCA]), $LiNi_{0.33}Co_{0.33}Mn_{0.33}O_2$ (lithium nickel manganese cobalt oxide [NMC]), and $LiNi_{0.5}Mn_{0.5}O_2$ (lithium manganese nickelate).

Specific examples of the transition metal oxides having a spinel-type structure (MB) include $LiCoMnO_4$, $Li_2FeMn_3O_8$, $Li_2CuMn_3O_8$, $Li_2CrMn_3O_8$, and $Li_2NiMn_3O_8$.

Examples of the lithium-containing transition metal phosphoric oxide compounds (MC) include olivine-type iron phosphate salts such as $LiFePO_4$ and $Li_3Fe_2(PO_4)_3$, iron pyrophosphates such as $LiFeP_2O_7$, cobalt phosphates such as LiCoPO$_4$, and monoclinic nasicon-type vanadium phosphate salt such as Li$_3$V$_2$(PO$_4$)$_3$ (lithium vanadium phosphate).

Examples of the lithium-containing transition metal halogenated phosphoric acid compounds (MD) include iron fluorophosphates such as Li$_2$FePO$_4$F, manganese fluorophosphates such as Li$_2$MnPO$_4$F, cobalt fluorophosphates such as Li$_2$CoPO$_4$F.

Examples of the lithium-containing transition metal silicon silicate compounds (ME) include Li$_2$FeSiO$_4$, Li$_2$MnSiO$_4$, Li$_2$CoSiO$_4$, and the like.

The volume-average particle diameter (circle-equivalent average particle diameter) of the positive electrode active material that is used in the all-solid state secondary battery of the present invention is not particularly limited. Meanwhile, the volume-average particle diameter is preferably 0.1 μm to 50 μm. In order to provide a predetermined particle diameter to the positive electrode active material, an ordinary crusher or classifier may be used. Positive electrode active materials obtained using a firing method may be used after being washed with water, an acidic aqueous solution, an alkaline aqueous solution, or an organic solvent. The volume-average particle diameter (circle-equivalent average particle diameter) of positive electrode active material particles can be measured using a laser diffraction/scattering-type particle size distribution measurement instrument LA-920 (trade name, manufactured by Horiba Ltd.).

The concentration of the positive electrode active material is not particularly limited, but is preferably 10% to 90% by mass and more preferably 20% to 80% by mass with respect to 100% by mass of the solid components in the composition for a positive electrode.

The positive electrode active material may be used singly or two or more positive electrode active materials may be used in combination.

(Negative Electrode Active Material)

Next, a negative electrode active material that is used in the solid electrolyte composition for forming the negative electrode active material layer in the all-solid state secondary battery of the present invention (hereinafter, also referred to as the composition for a negative electrode) will be described. The negative electrode active material is preferably a negative electrode active material capable of reversibly intercalating and deintercalating lithium ions. The above-described material is not particularly limited, and examples thereof include carbonaceous materials, metal oxides such as tin oxide and silicon oxide, metal complex oxides, a lithium single body or lithium alloys such as lithium aluminum alloys, metals capable of forming alloys with lithium such as Sn, Si, and In and the like. Among these, carbonaceous materials or metal complex oxides are preferably used in terms of reliability. In addition, the metal complex oxides are preferably capable of absorbing and deintercalating lithium. The materials are not particularly limited, but preferably contain titanium and/or lithium as constituent components from the viewpoint of high-current density charging and discharging characteristics.

The carbonaceous material that is used as the negative electrode active material is a material substantially consisting of carbon. Examples thereof include petroleum pitch, carbon black such as acetylene black (AB), natural graphite, artificial graphite such as highly oriented pyrolytic graphite, and carbonaceous material obtained by firing a variety of synthetic resins such as polyacrylonitrile (PAN)-based resins or furfuryl alcohol resins. Furthermore, examples thereof also include a variety of carbon fibers such as PAN-based carbon fibers, cellulose-based carbon fibers, pitch-based carbon fibers, vapor-grown carbon fibers, dehydrated polyvinyl alcohol (PVA)-based carbon fibers, lignin carbon fibers, glassy carbon fibers, and active carbon fibers, mesophase microspheres, graphite whisker, flat graphite, and the like.

The metal oxides and the metal complex oxides being applied as the negative electrode active material are particularly preferably amorphous oxides, and furthermore, chalcogenides which are reaction products between a metal element and an element belonging to Group XVI of the periodic table are also preferably used. The amorphous oxides mentioned herein refer to oxides having a broad scattering band having a peak of a 2θ value in a range of 20° to 40° in an X-ray diffraction method in which CuKα rays are used and may have crystalline diffraction lines. The highest intensity in the crystalline diffraction line appearing at the 2θ value of 40° or more and 70° or less is preferably 100 times or less and more preferably five times or less of the diffraction line intensity at the peak of the broad scattering line appearing at the 2θ value of 20° or more and 40° or less and particularly preferably does not have any crystalline diffraction lines.

In a compound group consisting of the amorphous oxides and the chalcogenides, amorphous oxides of semimetal elements and chalcogenides are more preferred, and elements belonging to Groups XIII (IIIB) to XV (VB) of the periodic table, oxides consisting of one element or a combination of two or more elements of Al, Ga, Si, Sn, Ge, Pb, Sb, and Bi, and chalcogenides are particularly preferred. Specific examples of preferred amorphous oxides and chalcogenides include Ga$_2$O$_3$, SiO, GeO, SnO, SnO$_2$, PbO, PbO$_2$, Pb$_2$O$_3$, Pb$_2$O$_4$, Pb$_3$O$_4$, Sb$_2$O$_3$, Sb$_2$O$_4$, Sb$_2$O$_5$, Bi$_2$O$_3$, Bi$_2$O$_4$, SnSiO$_3$, GeS, SnS, SnS$_2$, PbS, PbS$_2$, Sb$_2$S$_3$, Sb$_2$S$_5$, and SnSiS$_3$. In addition, these amorphous oxides may be complex oxides with lithium oxide, for example, Li$_2$SnO$_2$.

The average particle diameter of the negative electrode active material is preferably 0.1 μm to 60 μm. In order to provide a predetermined particle diameter, an ordinary crusher or classifier is used. For example, a mortar, a ball mill, a sand mill, an oscillatory ball mill, a satellite ball mill, a planetary ball mill, a swirling airflow-type jet mill, a sieve, or the like is preferably used. During crushing, it is also possible to carry out wet-type crushing in which water or an organic solvent such as methanol is made to coexist as necessary. In order to provide a desired particle diameter, classification is preferably carried out. The classification method is not particularly limited, and it is possible to use a sieve, a wind power classifier, or the like depending on the necessity. Both of dry-type classification and wet-type classification can be carried out. The average particle diameter of negative electrode active material particles can be measured using the same method as the method for measuring the volume-average particle diameter of the positive electrode active material.

In the present invention, as the negative electrode active materials, graphite is preferably used.

In addition, negative electrode active materials containing titanium atoms are also preferably used. More specifically, Li$_4$Ti$_5$O$_{12}$ is preferred since the volume fluctuation during the absorption and emission of lithium ions is small and thus the high-speed charging and discharging characteristics are excellent and the deterioration of electrodes is suppressed, whereby it becomes possible to improve the service lives of lithium ion secondary batteries.

The concentration of the negative electrode active material is not particularly limited, but is preferably 10 to 80% by mass and more preferably 20 to 70% by mass with respect to 100% by mass of the solid components in the composition for a negative electrode.

The negative electrode active material may be used singly or two or more negative electrode active materials may be used in combination.

(Dispersion Medium)

The solid electrolyte composition of the present invention may contain a dispersion medium. The dispersion medium needs to be capable of dispersing the respective components described above, and specific examples thereof include the following media.

Examples of alcohol compound solvents include methyl alcohol, ethyl alcohol, 1-propyl alcohol, 2-propyl alcohol, 2-butanol, t-butanol, ethylene glycol, propylene glycol, glycerin, 1,6-hexanediol, cyclohexanediol, sorbitol, xylitol, 2-methyl-2,4-pentanediol, 1,3-butanediol, and 1,4-butanediol.

Examples of ether compound solvents include alkylene glycol alkyl ethers (ethylene glycol monomethyl ether, ethylene glycol monobutyl ether, diethylene glycol, dipropylene glycol, propylene glycol monomethyl ether, propylene glycol dimethyl ether, diethylene glycol monomethyl ether, diethylene glycol dimethyl ether (diglyme), triethylene glycol, polyethylene glycol, propylene glycol monomethyl ether, dipropylene glycol monomethyl ether, tripropylene glycol monomethyl ether, diethylene glycol monobutyl ether, and the like), dimethyl ether, diethyl ether, diisopropyl ether, dibutyl ether, cyclohexyl methyl ether, t-butyl methyl ether, tetrahydrofuran, and dioxane.

Examples of amide compound solvents include N,N-dimethylformamide, 1-methyl-2-pyrrolidone, 2-pyrrolidinone, 1,3-dimethyl-2-imidazolidinone, ε-caprolactam, formamide, N-methyl formamide, acetamide, N-methylacetamide, N,N-dimethylacetamide, N-methylpropanamide, and hexamethylphosphoric triamide.

Examples of amino compound solvents include triethylamine, diisopropylethylamine, and tributylamine.

Examples of ketone compound solvents include acetone, methyl ethyl ketone, methyl isobutyl ketone, cyclohexanone, and diisobutyl ketone.

Examples of aromatic compound solvents include benzene, toluene, and xylene.

Examples of ester compound solvents include ethyl acetate, propyl acetate, butyl acetate, ethyl formate, propyl formate, butyl formate, ethyl lactate, propylene glycol monomethyl ether acetate, methyl isobutyrate, isopropyl isobutyrate, methyl pivalate, and isopropyl cyclohexanecarboxylate.

Examples of aliphatic compound solvents include pentane, hexane, heptane, octane, decane, and cyclohexane.

Examples of nitrile compound solvents include acetonitrile, propionitrile, and butyronitrile.

One kind of the dispersion medium may be used singly or two or more kinds of the dispersion media may be used in combination.

The boiling points of the dispersion medium at normal pressure (one atmosphere) are preferably 50° C. or higher and more preferably 70° C. or higher. The upper limit is preferably 250° C. or lower and more preferably 220° C. or lower.

In the present invention, at least one compound solvent of an alcohol compound solvent (preferably t-butanol), an ether compound solvent (preferably dibutyl ether, propylene glycol dimethyl ether, or diglyme), an amide compound solvent (preferably N,N-dimethylformamide), an aromatic compound solvent (preferably toluene), an ester compound solvent (preferably propylene glycol monomethyl ether acetate), and an aliphatic compound solvent (preferably heptane) is preferably used, and a hydrocarbon-based solvent is more preferably used. Examples of the hydrocarbon-based solvent include the aromatic compound solvent and the aliphatic compound solvent.

The use of the dispersant medium enables the prevention of the deterioration of the solid electrolyte and the obtainment of compositions in which the dendritic polymer is dispersed.

(Moisture Content of Solid Electrolyte Composition)

The moisture content of the solid electrolyte composition of the present invention, that is, the moisture content as the solid electrolyte composition containing the dispersion medium is preferably 50 ppm or less, more preferably 40 ppm or less, and still more preferably 30 ppm or less. The lower limit value of the moisture content is not particularly limited, but is realistically 0.001 ppm or more.

Meanwhile, the moisture content of the solid electrolyte composition can be measured using the Karl Fischer method. As the measurement instrument, for example, a moisture meter CA-200 (trade name, manufactured by Mitsubishi Chemical Analytech Co., Ltd.) can be used, and, as the Karl Fischer solution, AQUAMICRON AX (trade name, manufactured by Mitsubishi Chemical Corporation) can be used.

The moisture content in the above-described preferred range enables the suppression of reactions between a sulfide-based inorganic solid electrolyte and water in a case in which the sulfide-based inorganic solid electrolyte is used as the inorganic solid electrolyte.

The content of the dispersion medium is preferably 10 to 300 parts by mass and more preferably 50 to 150 parts by mass with respect to 100 parts by mass of the total solid content mass of the solid electrolyte composition.

<Collector (Metal Foil)>

The collectors of positive and negative electrodes are preferably electron conductors that do not cause chemical changes. The collector of the positive electrode is preferably a collector obtained by treating the surface of an aluminum or stainless steel collector with carbon, nickel, titanium, or silver in addition to an aluminum collector, a stainless steel collector, a nickel collector, a titanium collector, or the like, and, among these, an aluminum collector and an aluminum alloy collector are more preferred. The collector of the negative electrode is preferably an aluminum collector, a copper collector, a stainless steel collector, a nickel collector, or a titanium collector and more preferably an aluminum collector, a copper collector, or a copper alloy collector.

Regarding the shape of the collector, generally, collectors having a film sheet-like shape are used, but it is also possible to use net-shaped collectors, punched collectors, compacts of lath bodies, porous bodies, foaming bodies, or fiber groups, and the like.

The thickness of the collector is not particularly limited, but is preferably 1 μm to 500 μm. In addition, the surface of the collector is preferably provided with protrusions and recesses by means of a surface treatment.

<Production of All-Solid State Secondary Battery>

The all-solid state secondary battery may be produced using an ordinary method. Specific examples thereof include a method in which the solid electrolyte composition of the present invention is applied onto a metal foil which serves as the collector, thereby producing an electrode sheet for an all-solid state secondary battery on which a coated film is formed.

In the all-solid state secondary battery of the present invention, the electrode layers contain active materials. From the viewpoint of improving ion conductivity, the electrode layers preferably contain the inorganic solid electrolyte. In addition, from the viewpoint of improving the bonding properties between solid particles, between electrodes, and between the electrode and the collector, the electrode layers preferably contain a dendritic polymer and also preferably contain the binder.

The solid electrolyte layer contains the dendritic polymer and the inorganic solid electrolyte. From the viewpoint of improving the bonding properties between solid particles and between layers, the solid electrolyte layer also preferably contains the binder.

For example, a composition which serves as a positive electrode material is applied onto a metal foil which is a positive electrode collector so as to form a positive electrode active material layer, thereby producing a positive electrode sheet for a battery. The solid electrolyte composition of the present invention is applied onto the positive electrode active material layer, thereby forming a solid electrolyte layer. Furthermore, a composition which serves as a negative electrode material is applied onto the solid electrolyte layer, thereby forming a negative electrode active material layer. A collector for the negative electrode (metal foil) is overlaid on the negative electrode active material layer, whereby it is possible to obtain a structure of an all-solid state secondary battery in which the solid electrolyte layer is sandwiched between a positive electrode layer and a negative electrode layer.

Meanwhile, the respective compositions described above may be applied using an ordinary method. At this time, the composition for forming the positive electrode active material layer, the composition for forming the inorganic solid electrolyte layer, and the composition for forming the negative electrode active material layer may be dried after being applied respectively or may be dried after being applied to multiple layers.

The drying temperature is not particularly limited. Meanwhile, the lower limit is preferably 30° C. or higher and more preferably 60° C. or higher, and the upper limit is preferably 300° C. or lower and more preferably 250° C. or lower. In a case in which the compositions are heated in the above-described temperature range, it is possible to remove the dispersion medium and form a solid state.

[Usages of All-Solid State Secondary Battery]

The all-solid state secondary battery of the present invention can be applied to a variety of usages. Application aspects are not particularly limited, and, in the case of being mounted in electronic devices, examples thereof include notebook computers, pen-based input personal computers, mobile personal computers, e-book players, mobile phones, cordless phone handsets, pagers, handy terminals, portable faxes, mobile copiers, portable printers, headphone stereos, video movies, liquid crystal televisions, handy cleaners, portable CDs, mini discs, electric shavers, transceivers, electronic notebooks, calculators, portable tape recorders, radios, backup power supplies, memory cards, and the like. Additionally, examples of consumer usages include automobiles, electric vehicles, motors, lighting equipment, toys, game devices, road conditioners, watches, strobes, cameras, medical devices (pacemakers, hearing aids, shoulder massage devices, and the like), and the like. Furthermore, the all-solid state secondary battery can be used for a variety of military usages and universe usages. In addition, the all-solid state secondary battery can also be combined with solar batteries.

Among these, the all-solid state secondary battery is preferably applied to applications for which a high capacity and high-rate discharging characteristics are required. For example, in electricity storage facilities in which an increase in the capacity is expected in the future, it is necessary to satisfy both high safety, which is essential, and furthermore, the battery performance. In addition, in electric vehicles mounting high-capacity secondary batteries and domestic usages in which batteries are charged out every day, better safety is required against overcharging. According to the present invention, it is possible to preferably cope with the above-described use aspects and exhibit excellent effects.

According to the preferred embodiment of the present invention, individual application forms as described below are derived.

[1] Solid electrolyte compositions containing electrode active materials (compositions for an electrode that is a positive electrode or negative electrode).

[2] Electrode sheets for an all-solid state secondary battery having a positive electrode active material layer, a solid electrolyte layer, and a negative electrode active material layer in this order, in which at least one layer of the positive electrode active material layer, the solid electrolyte layer, or the negative electrode active material layer contains an inorganic solid electrolyte having ion conductivity of metals belonging to Group I or II of the periodic table and a dendritic polymer which is at least one polymer selected from the group consisting of dendrons, dendrimers, and hyperbranched polymers and has at least one functional group selected from the following group of functional groups (A).

<Group of Functional Groups (A)>

A hydroxy group, a thiol group, a carboxy group, a sulfonic acid group, a phosphoric acid group, an amino group, a cyano group, an isocyanate group, an acid anhydride group, a (meth)acryloyloxy group, an epoxy group, an oxetanyl group, an alkoxide group, a group having a ring structure of three or more rings, an amide group, a urea group, a urethane group, an imide group, and an isocyanurate group.

[3] Electrode sheets for an all-solid state secondary battery having a positive electrode active material layer, a solid electrolyte layer, and a negative electrode active material layer in this order, in which all layers of the positive electrode active material layer, the solid electrolyte layer, and the negative electrode active material layer contain the inorganic solid electrolyte and the dendritic polymer.

[4] All-solid state secondary batteries constituted using the above-described electrode sheet for an all-solid state-secondary battery.

[5] Methods for manufacturing an electrode sheet for an all-solid state secondary battery in which the solid electrolyte composition is applied onto a metal foil, thereby forming a film.

[6] Methods for manufacturing an electrode sheet for an all-solid state secondary battery in which a wet slurry of the solid electrolyte composition is applied.

[7] Methods for manufacturing an all-solid state secondary battery in which all-solid state secondary batteries are manufactured using the method for manufacturing an electrode sheet for an all-solid state secondary battery.

Meanwhile, the electrode sheet for an all-solid state secondary battery of the present invention includes not only a sheet containing an active material such as a positive electrode sheet for an all-solid state secondary battery produced in examples described below but also a solid electrolyte sheet (a sheet containing no active materials) produced in the examples described below.

Meanwhile, examples of the methods in which the solid electrolyte composition is applied onto a metal foil include coating (wet-type coating, spray coating, spin coating, slit coating, stripe coating, bar coating, or dip coating), and wet-type coating is preferred.

All-solid state secondary batteries refer to secondary batteries having a positive electrode, a negative electrode, and an electrolyte which are all constituted of solid. In other words, all-solid state secondary batteries are differentiated from electrolytic solution-type secondary batteries in which a carbonate-based solvent is used as an electrolyte. Among these, the present invention is assumed to be an inorganic all-solid state secondary battery. All-solid state secondary batteries are classified into organic (high-molecular-weight) all-solid state secondary batteries in which a high-molecular-weight compound such as polyethylene oxide is used as an electrolyte and inorganic all-solid state secondary batteries in which the Li—P—S-based glass, LLT, LLZ, or the like is used. Meanwhile, the application of high-molecular-weight compounds to inorganic all-solid state secondary batteries is not inhibited, and high-molecular-weight compounds can also be applied as binders of positive electrode active materials, negative electrode active materials, and inorganic solid electrolytes.

Inorganic solid electrolytes are differentiated from electrolytes in which the above-described high-molecular-weight compound is used as an ion conductive medium (high-molecular-weight electrolyte), and inorganic compounds serve as ion conductive media. Specific examples thereof include the Li—P—S glass, LLT, and LLZ. Inorganic solid electrolytes do not emit positive ions (Li ions) and exhibit an ion transportation function. In contrast, there are cases in which materials serving as an ion supply source which is added to electrolytic solutions or solid electrolyte layers and emits positive ions (Li ions) are referred to as electrolytes; however, in the case of being differentiated from electrolytes as the ion transportation materials, the materials are referred to as "electrolyte salts" or "supporting electrolytes". Examples of the electrolyte salts include LiTFSI.

In the present invention, "compositions" refer to mixtures obtained by uniformly mixing two or more components. Here, compositions may partially include agglomeration or uneven distribution as long as the compositions substantially maintain uniformity and exhibit desired effects.

EXAMPLES

Hereinafter, the present invention will be described in more detail on the basis of examples. Meanwhile, the present invention is not interpreted to be limited thereto. In the following examples, "parts" and "%" are mass-based unless particularly otherwise described. In addition, "-" used in the tables indicates that the corresponding components are not included in compositions of examples.

<Synthesis of Dendritic Polymer>

Synthesis Example 1

Synthesis of Exemplary Compound (A-4)
A polyamidoamine dendrimer, ethylenediamine core, generation 3 (manufactured by Aldrich-Sigma, Co. LLC., Catalog No. 412422) (1.0 g) was added to a 20 mL Schlenk flask equipped with a Dean-Stark apparatus to which a molecular sieve 3A was added. Furthermore, linolenic acid (manufactured by Wako Pure Chemical Industries, Ltd.) (1.2 g) was added thereto, thereby substituting the atmosphere with nitrogen. A reaction solution was heated and stirred at 230° C. for five hours under the flow of nitrogen.

A reaction product obtained in the above-described manner was analyzed by means of $^1$H NMR. It was confirmed that, in the reaction product, 50% of the terminals were substituted with the linolenic acid and the remaining 50% remained as amine, and thus the reaction product was identified as an exemplary compound (A-4). The number-average molecular weight and the average particle diameter were the numerical values shown in Table 1.

Synthesis Example 2

Synthesis of Exemplary Compound (A-15)
An exemplary compound (A-15) was synthesized in the same manner as in Synthesis Example 1 except for the fact that a hyperbranched bis-MPA polyester-64-hydroxyl (manufactured by Aldrich-Sigma, Co. LLC., Catalog No. 686573) was used instead of the polyamidoamine dendrimer, ethylenediamine core, generation 3. The number-average molecular weight and the average particle diameter were the numerical values shown in Table 1.

Synthesis Example 3

Synthesis of Exemplary Compound (A-16)
A hyperbranched bis-MPA polyester-64-hydroxyl (manufactured by Aldrich-Sigma, Co. LLC., Catalog No. 686573) (1.0 g) was added to a 20 mL Schlenk flask equipped with a Dean-Stark apparatus to which a molecular sieve 3A was added. Furthermore, linolenic acid (manufactured by Wako Pure Chemical Industries, Ltd.) (1.8 g) was added thereto, thereby substituting the atmosphere with nitrogen. A reaction solution was heated and stirred at 230° C. for five hours under the flow of nitrogen. The reaction solution was cooled to 100° C., pyridine (5 mL) and dimethyl aminonpyridine (0.02 g) were added thereto, a succinic anhydride (manufactured by Wako Pure Chemical Industries, Ltd.) (0.22 g) was added thereto, and the reaction solution was further continuously heated and stirred at 100° C. for two hours. An organic layer was extracted using toluene, washed with an aqueous solution of 1 N of hydrochloric acid, and then dried using magnesium sulfate. After the magnesium sulfate was removed, the organic layer was condensed.

The condensed reaction product was analyzed by means of $^1$H NMR. It was confirmed that, in the reaction product, 75% of the terminals were substituted with the linolenic acid and the remaining 25% was a carboxylic acid in which the succinic anhydride opened rings, and there were no unreacted terminal OH groups, and thus the reaction product was identified as an exemplary compound (A-16). The number-average molecular weight and the average particle diameter were the numerical values shown in Table 1.

Synthesis Example 4

Synthesis of Exemplary Compound (A-17)
A hyperbranched bis-MPA polyester-64-hydroxyl (manufactured by Aldrich-Sigma, Co. LLC., Catalog No. 686573) (1.0 g) was added to a 20 mL Schlenk flask equipped with a Dean-Stark apparatus to which a molecular sieve 3A was added. Furthermore, linolenic acid (manufactured by Wako Pure Chemical Industries, Ltd.) (1.8 g) and deoxycholic acid (manufactured by Wako Pure Chemical Industries, Ltd.)

(0.96 g) were added thereto, and the components were heated and stirred at 230° C. for five hours.

A reaction product obtained in the above-described manner was analyzed by means of $^1$H NMR. It was confirmed that, in the reaction product, 75% of the terminals were substituted with the linolenic acid and the remaining 25% was substituted with the deoxycholic acid, and there were no unreacted terminal OH groups, and thus the reaction product was identified as an exemplary compound (A-17). The number-average molecular weight and the average particle diameter were the numerical values shown in Table 1.

Synthesis Example 5

Synthesis of Exemplary Compound (A-18)
An exemplary compound (A-18) was synthesized in the same manner as in Synthesis Example 4 except for the fact that pyrenebutanoic acid (manufactured by Tokyo Chemical Industry Co., Ltd.) was used instead of the deoxycholic acid 3. The number-average molecular weight and the average particle diameter were the numerical values shown in Table 1.

Synthesis Example 6

Synthesis of Exemplary Compound (A-20)
To three 200 mL flasks, dodecyl acrylate (manufactured by Wako Pure Chemical Industries, Ltd.) (12.1 g), acrylonitrile (manufactured by Wako Pure Chemical Industries, Ltd.) (3.8 g), and furthermore, as a chain transfer agent, mercaptopropionic acid (manufactured by Tokyo Chemical Industry Co., Ltd.) (3.3 g) were added and dissolved in propylene glycol monomethyl ether acetate (100 mL). The solution was heated to 80° C. under the flow of nitrogen, and V-601 (trade name, manufactured by Wako Pure Chemical Industries, Ltd.) (0.35 g) was added thereto as a radical polymerization initiator. The solution was continuously heated and stirred at 80° C. for eight hours, and the obtained polymer solution was reprecipitated in methanol, thereby obtaining a terminal carboxylic acid-modified (50% by mole of dodecyl polyacrylate and 50% by mole of acrylonitrile) copolymer (a macromonomer represented by P2). The number-average molecular weight was 3,500.

A hyperbranched bis-MPA polyester-64-hydroxyl (manufactured by Aldrich-Sigma, Co. LLC., Catalog No. 686573) (1.0 g) was added to a 20 mL Schlenk flask equipped with a Dean-Stark apparatus to which a molecular sieve 3A was added, the macromonomer obtained above (10.2 g) was added thereto, and the components were dissolved in 1,2-dichlorobenzene. This solution was put into an azeotropic state at 190° C. for six hours so as to be dehydrated, and this was reprecipitated in isopropyl alcohol. After that, the precipitate was filtered and dried.

A reaction product obtained in the above-described manner was analyzed by means of $^1$H NMR. It was confirmed that, in the reaction product, 50% of the terminals were substituted with the macromonomer and the remaining 50% was substituted with unreacted terminal OH groups, and thus the reaction product was identified as an exemplary compound (A-20). The number-average molecular weight and the average particle diameter were the numerical values shown in Table 1.

Meanwhile, the exemplary compounds (A-1), (A-5), and (A-10) were not particularly purified, and commercially available products of Aldrich-Sigma, Co. LLC. were used.
—Instrument and Conditions for Measuring Number-Average Molecular Weights—
The number-average molecular weight was a value obtained by standard polystyrene conversion through gel permeation chromatography (GPC).

The measurement instrument and the measurement conditions are described below.
Column: Two TOSOH TSKgel Super AWM-H (trade name, manufactured by Tosoh Corporation) were connected to each other
Carrier: 10 mM LiBr/N-methylpyrrolidone
Measurement temperature: 40° C.
Carrier flow rate: 1.0 ml/min
Specimen concentration: 0.1% by mass
Detector: Refractive index (RI) detector
—Instrument and Conditions for Measuring Volume-Average Particle Diameters—
One percent by mass of a dispersion liquid was diluted and prepared using the dendritic polymer and an arbitrary solvent (the dispersion medium used to prepare the solid electrolyte composition, for example, heptane) in a 20 ml sample bottle. The diluted dispersion specimen was irradiated with 1 kHz ultrasonic waves for 10 minutes and was then immediately used for testing. Data capturing was carried out 50 times using this dispersion liquid specimen, a laser diffraction/scattering-type particle size distribution measurement instrument LA-920 (trade name, manufactured by Horiba Ltd.), and a silica cell for measurement at a temperature of 25° C., thereby measuring the volume-average particle diameter. Five specimens were produced and measured every level, and the average values thereof were employed.
<Synthesis of Sulfide-Based Inorganic Solid Electrolyte>
—Synthesis of Li—P—S-Based Glass—
As a sulfide-based inorganic solid electrolyte, Li—P—S-based glass was synthesized with reference to a non-patent document of T. Ohtomo, A. Hayashi, M. Tatsumisago, Y. Tsuchida, S. HamGa, K. Kawamoto, Journal of Power Sources, 233, (2013), pp. 231 to 235 and A. Hayashi, S. Hama, H. Morimoto, M. Tatsumisago, T. Minami, Chem. Lett., (2001), pp. 872 and 873.

Specifically, in a globe box under an argon atmosphere (dew point: −70° C.), lithium sulfide (Li$_2$S, manufactured by Aldrich-Sigma, Co. LLC. Purity: >99.98%) (2.42 g) and diphosphorus pentasulfide (P$_2$S$_5$, manufactured by Aldrich-Sigma, Co. LLC. Purity: >99%) (3.90 g) were respectively weighed, injected into an agate mortar, and mixed using an agate muddler for five minutes. Meanwhile, the mixing ratio between Li$_2$S and P$_2$S$_5$ was set to 75:25 in terms of molar ratio.

66 zirconia beads having a diameter of 5 mm were injected into a 45 mL zirconia container (manufactured by Fritsch Japan Co., Ltd.), the full amount of the mixture of the lithium sulfide and the diphosphorus pentasulfide was injected thereinto, and the container was sealed in an argon atmosphere. The container was set in a planetary ball mill P-7 (trade name) manufactured by Fritsch Japan Co., Ltd., mechanical milling was carried out at a temperature of 25° C. and a rotation speed of 510 rpm for 20 hours, thereby obtaining yellow powder (6.20 g) of a sulfide solid electrolyte (Li—P—S-based glass).

Example 1

<Preparation of Individual Compositions>
—Preparation of Solid Electrolyte Composition S-1—
180 zirconia beads having a diameter of 5 mm were injected into a 45 mL zirconia container (manufactured by Fritsch Japan Co., Ltd.), an oxide-based inorganic solid electrolyte LLT (manufactured by Toshima Manufacturing Co., Ltd.) (8.0 g), the exemplary compound (A-1) (1.0 g), and LiTFSI (manufactured by Aldrich-Sigma, Co. LLC.)

were added thereto, and, as a dispersion medium, N,N-dimethylformamide (15.0 g) was injected thereinto. After that, the container was set in a planetary ball mill P-7 (trade name, manufactured by Fritsch Japan Co., Ltd.), the components were continuously mixed at a temperature of 25° C. and a rotation speed of 300 rpm for two hours, thereby preparing a solid electrolyte composition S-1.

(2) Preparation of Solid Electrolyte Composition (S-2)

180 zirconia beads having a diameter of 5 mm were injected into a 45 mL zirconia container (manufactured by Fritsch Japan Co., Ltd.), and the sulfide-based inorganic solid electrolyte Li—P—S-based glass (9.6 g) synthesized above, the exemplary compound (A-1) (0.4 g), and, as an organic solvent, N,N-dimethylformamide (15.0 g) were injected thereinto. After that, the container was set in a planetary ball mill P-7 (manufactured by Fritsch Japan Co., Ltd.), the components were continuously stirred at a temperature of 25° C. and a rotation speed of 300 rpm for two hours, thereby preparing a solid electrolyte composition (S-2).

—Preparation of Solid Electrolyte Compositions S-2 to S-11 and T-1 to T-3—

Solid electrolyte compositions S-2 to S-11 and T-1 to T-3 were manufactured using the same method as for the solid electrolyte composition S-1 or S-2 except for the fact that the compositions were changed as shown in Table 2.

The compositions of the solid electrolyte compositions are summarized in Table 2.

Here, the solid electrolyte compositions S-2 to S-11 are the solid electrolyte composition of the present invention, and the solid electrolyte compositions T-1 to T-3 are comparative solid electrolyte compositions.

—Preparation of Composition for Positive Electrode—

Acetylene black (5 parts by mass), N-methyl pyrrolidone (270 parts by mass), and a positive electrode active material (100 parts by mass) and a solid electrolyte composition (75 parts by mass) described for examples of the composition for a positive electrode in Table 3 were added to a planetary mixer (TK HIVIS MIX, trade name, manufactured by Primix Corporation) and stirred at a rotation speed of 40 rpm and a temperature of 25° C. for one hour, thereby preparing each of compositions for a positive electrode shown in Table 3.

—Preparation of Composition for Negative Electrode—

Acetylene black (5 parts by mass), N-methyl pyrrolidone (270 parts by mass), and a negative electrode active material (100 parts by mass) and a solid electrolyte composition (75 parts by mass) described for examples of the composition for a negative electrode in Table 3 were added to a planetary mixer (TK HIVIS MIX, trade name, manufactured by Primix Corporation) and stirred at a rotation speed of 40 rpm and a temperature of 25° C. for one hour, thereby preparing each of compositions for a negative electrode shown in Table 3.

<Test>

On the solid electrolyte compositions, the compositions for a positive electrode, and the compositions for a negative electrode prepared above, dispersion stability tests were carried out. Hereinafter, the testing method will be described. In addition, the test and the measurement results are summarized in Table 3.

In addition, the specific functional groups and the specific substituents in the exemplary compounds used are summarized in Table 4.

<Dispersion Stability Test>

Each of the compositions was prepared and then left to stand in a transparent sample bottle at 25° C. for 24 hours. The state of the composition was visually observed before and after the composition being left to stand for 24 hours.

TABLE 2

| Solid electrolyte composition | Inorganic solid electrolyte Kind | Parts by mass | Dendritic polymer Kind | Parts by mass | Lithium salt Kind | Parts by mass | Dispersion medium Kind | Parts by mass |
|---|---|---|---|---|---|---|---|---|
| S-1  | LLT     | 80 | A-1              | 10 | LiTFSI | 10 | N,N-dimethylformamide            | 150 |
| S-2  | Li—P—S  | 96 | A-1              | 4  | —      | —  | N,N-dimethylformamide            | 150 |
| S-3  | LLT     | 80 | A-4              | 10 | LiTFSI | 10 | Dibutylether                     | 150 |
| S-4  | Li—P—S  | 96 | A-4              | 4  | —      | —  | Dibutylether                     | 150 |
| S-5  | Li—P—S  | 96 | A-5              | 4  | —      | —  | t-Butanol                        | 150 |
| S-6  | Li—P—S  | 96 | A-10             | 4  | —      | —  | Propylene glycol dimethyl ether  | 150 |
| S-7  | Li—P—S  | 95 | A-15             | 4  | LiTFSI | 1  | Propylene glycol monomethyl ether acetate | 150 |
| S-8  | Li—P—S  | 95 | A-16             | 4  | LiTFSI | 1  | Propylene glycol monomethyl ether | 150 |
| S-9  | Li—P—S  | 95 | A-17             | 4  | LiTFSI | 1  | Diglyme                          | 150 |
| S-10 | Li—P—S  | 95 | A-18             | 4  | LiTFSI | 1  | Toluene                          | 150 |
| S-11 | Li—P—S  | 95 | A-20             | 4  | LiTFSI | 1  | Heptane                          | 150 |
| T-1  | Li—P—S  | 95 | PVdF-HFP         | 5  | —      | —  | Butyl acetate                    | 150 |
| T-2  | Li—P—S  | 96 | Particle polymer | 4  | —      | —  | Toluene                          | 150 |
| T-3  | Li—P—S  | 95 | Compound 3       | 4  | LiTFSI | 1  | Methyl isobutyl ketone           | 150 |

<Notes of table>
A-1, 5, 10: Products manufactured by Aldrich-Sigma, Co. LLC. (refer to Table 1)
A-4, 15, 16, 17, 18, 20: Exemplary compounds synthesized above (refer to Table 1)
LLT: Li$_{0.33}$La$_{0.55}$TiO$_3$ (manufactured by Toshima Manufacturing Co., Ltd.)
Li—P—S: Li—P—S-based glass synthesized above
PVdF-HFP: Polyvinylidene fluoride-hexafluoropropylene copolymer (manufactured by Arkema K.K., mass average molecular weight: 100,000)
Particle polymer: The polymer particles A described in Paragraphs "0087" and "0088" of JP2013-8611A
Compound 3: The compound 3 described in Paragraph "0072" of JP2014-43487A After the composition was left to stand for 24 hours, the percentage of precipitated solid components with respect to the state of the composition before being left to stand for 24 hours was visually observed and evaluated. The evaluation standards are described below. C or higher ranks are passing levels.

A: No changes were observed.

B: The percentage of precipitated solid components was 10% or less.

C: The percentage of precipitated solid components was more than 10% and 30% or less.

D: The percentage of precipitated solid components was more than 30% and 80% or less.

E: The percentage of precipitated solid components was more than 80%.

<Production of Sheets>

—Production of Solid Electrolyte Sheets—

The solid electrolyte composition S-1 was applied onto a 20 μm-thick aluminum foil using an applicator (trade name: SA-201 Baker type applicator, manufactured by Tester Sangyo Co., Ltd.), heated at 80° C. for one hour, and then further heated at 120° C. for one hour, thereby drying the dispersion medium. After that, the solid electrolyte layer was heated (at 150° C.) and pressurized (350 MPa for 10 seconds) using a heat pressing machine, thereby obtaining a solid electrolyte sheet of Test No. 101. The thickness of the solid electrolyte layer was 50 μm.

Solid electrolyte sheets of Test Nos. 104, 106, 108, 110, c11, and c13 were produced in the same manner as the solid electrolyte sheet of Test No. 101 except for the fact that the solid electrolyte composition S-1 was changed to solid electrolyte compositions shown in Table 3.

—Production of Positive Electrode Sheets for All-Solid State Secondary Battery—

The composition for a positive electrode prepared above was applied onto a 20 μm-thick aluminum foil (collector) using the applicator (trade name: SA-201 Baker type applicator, manufactured by Tester Sangyo Co., Ltd.), heated at 80° C. for one hour, and then further heated at 110° C. for one hour, thereby drying the coating solvent. After that, the composition was heated (at 120° C.) and pressurized (350 MPa for one minute) using a heat pressing machine, thereby obtaining a 170 μm-thick positive electrode sheet for an all-solid state secondary battery having a laminated structure of a positive electrode active material layer and the aluminum foil.

—Production of Electrode Sheets for All-Solid State Secondary Battery—

A solid electrolyte composition described as an example of the solid electrolyte composition in Table 3 was applied onto the positive electrode sheet for an all-solid state secondary battery produced above using the applicator (trade name: SA-201 Baker type applicator, manufactured by Tester Sangyo Co., Ltd.), heated at 80° C. for one hour, and then further heated at 110° C. for one hour, thereby forming a 50 μm-thick solid electrolyte layer. After that, the composition for a negative electrode prepared above was further applied thereto, heated at 80° C. for one hour, and then further heated at 110° C. for one hour, thereby forming a 100 μm-thick negative electrode active material layer. A 20 μm-thick copper foil was overlaid on the negative electrode active material layer, heated (at 120° C.) and pressurized (350 MPa for one minute) using a heat pressing machine, thereby producing each of electrode sheets for an all-solid state secondary battery of Test Nos. 102, 103, 105, 107, 109, 111 to 118, c12, c14, and c15 shown in Table 3.

The electrode sheet for an all-solid state secondary battery has the constitution of FIG. 1 and has a laminated structure of the copper foil/the negative electrode active material layer/an inorganic solid electrolyte layer/the positive electrode sheet for an all-solid state secondary battery (the positive electrode active material layer/the aluminum foil). The positive electrode active material layer, the negative electrode active material layer, and the inorganic solid electrolyte layer were produced so as to respectively have a film thickness of 150 μm, 100 μm, or 50 μm in this order and were produced so that, in all of the electrode sheets for an all-solid state secondary battery, the variation in film thickness reached ±10% of the above-described film thickness.

TABLE 3

| | Layer constitution of all-solid state secondary battery electrode sheet | | | | | |
|---|---|---|---|---|---|---|
| | Positive electrode active material layer | | Solid electrolyte layer | | Negative electrode active material layer | |
| Test No. | Composition for positive electrode | Dispersion stability | Solid electrolyte composition | Dispersion stability | Composition for negative electrode | Dispersion stability |
| 101 | — | — | S-1 | C | — | — |
| 102 | LMO S-1 | C | S-1 | C | LTO S-1 | C |
| 103 | LMO S-1 | C | S-2 | B | Graphite S-1 | C |
| 104 | — | — | S-2 | B | — | — |
| 105 | LCO S-2 | B | S-2 | B | Graphite S-2 | B |
| 106 | — | — | S-3 | A | — | — |
| 107 | NMC S-3 | A | S-3 | A | Graphite S-3 | A |
| 108 | — | — | S-4 | A | — | — |
| 109 | NMC S-4 | A | S-4 | A | Graphite S-4 | A |
| 110 | — | — | S-5 | B | — | — |
| 111 | LMO S-5 | B | S-5 | B | Graphite S-5 | B |
| 112 | LMO S-6 | B | S-6 | B | Si S-6 | B |
| 113 | LMO S-7 | A | S-7 | A | Graphite S-7 | A |
| 114 | NMC S-8 | A | S-8 | A | Si S-8 | A |
| 115 | LMO S-9 | A | S-9 | A | Graphite S-9 | A |

TABLE 3-continued

Layer constitution of all-solid state secondary battery electrode sheet

| Test No. | Positive electrode active material layer | | Solid electrolyte layer | | Negative electrode active material layer | |
|---|---|---|---|---|---|---|
| | Composition for positive electrode | Dispersion stability | Solid electrolyte composition | Dispersion stability | Composition for negative electrode | Dispersion stability |
| 116 | LMO S-11 | A | S-11 | A | Si S-11 | A |
| 117 | LMO S-7 | A | S-8 | A | Graphite S-9 | A |
| 118 | LMO S-8 | A | S-8 | A | Graphite S-10 | A |
| c11 | — | — | T-1 | D | — | — |
| c12 | LCO T-1 | D | T-1 | D | Graphite T-1 | D |
| c13 | — | — | T-2 | D | — | — |
| c14 | LCO T-7 | D | T-2 | D | Graphite T-7 | D |
| c15 | LCO T-3 | D | T-3 | C | Graphite T-3 | D |

<Notes of table>
LMO: $LiMn_2O_4$, lithium manganate
LTO: $Li_4Ti_5O_{12}$, lithium titanate (trade name "ENERMIGHT LT-106", manufactured by Ishihara Sangyo Kaisha, Ltd.)
LCO: $LiCoO_2$, lithium cobaltate
NMC: $LiNi_{0.33}Co_{0.33}Mn_{0.33}O_2$, lithium nickel manganese cobalt oxide
Graphite: Artificial graphite (manufactured by Hitachi Chemical Company, Ltd., trade name: SMG-HP2K)

TABLE 4

| Test No. | Positive electrode active material layer | | | | Solid electrolyte layer | | |
|---|---|---|---|---|---|---|---|
| | Number of groups | Functional group (I) | Functional group (II) | Substituent (a) | Number of groups | Functional group (I) | Functional group (II) |
| 101 | — | — | — | — | 9 | Hydroxy (8) | Carboxy (1) |
| 102 | 9 | Hydroxy (8) | Carboxy (1) | — | 9 | Hydroxy (8) | Carboxy (1) |
| 103 | 9 | Hydroxy (8) | Carboxy (1) | — | 9 | Hydroxy (8) | Carboxy (1) |
| 104 | — | — | — | — | 9 | Hydroxy (8) | Carboxy (1) |
| 105 | 9 | Hydroxy (8) | Carboxy (1) | — | 9 | Hydroxy (8) | Carboxy (1) |
| 106 | — | — | — | — | 32 | Amino (16) | |
| 107 | 32 | Amino (16) | | Linolenic (16) | 32 | Amino (16) | |
| 108 | — | — | — | — | 32 | Amino (16) | |
| 109 | 32 | Amino (16) | | Linolenic (16) | 32 | Amino (16) | |
| 110 | — | — | — | — | 64 | Amino (64) | |
| 111 | 64 | Amino (64) | | — | 64 | Amino (64) | |
| 112 | 32 | Hydroxy (32) | | — | 32 | Hydroxy (32) | |
| 113 | 64 | Hydroxy (32) | | Linolenic (32) | 64 | Hydroxy (32) | |
| 114 | 64 | Carboxy (16) | | Linolenic (48) | 64 | Carboxy (16) | |
| 115 | 64 | Deoxycholic (16) | — | Linolenic (48) | 64 | Deoxycholic (16) | None |
| 116 | 64 | Hydroxy (32) | | Dodecyl acrylate-acrylonitrile (32) | 64 | Hydroxy (32) | |
| 117 | 64 | Hydroxy (32) | | Linolenic (32) | 64 | Carboxy (16) | |
| 118 | 64 | Carboxy (16) | | Linolenic (48) | 64 | Carboxy (16) | |
| c11 | — | — | — | — | — | — | — |
| c12 | — | — | — | — | — | — | — |
| c13 | — | — | — | — | — | — | — |
| c14 | — | — | — | — | — | — | — |
| c15 | — | — | — | — | — | — | — |

| Test No. | Solid electrolyte layer Substituent (a) | Negative electrode active material layer | | | |
|---|---|---|---|---|---|
| | | Number of groups | Functional group (I) | Functional group (II) | Substituent (a) |
| 101 | — | — | — | — | — |
| 102 | — | 9 | Hydroxy (8) | Carboxy (1) | — |
| 103 | — | 9 | Hydroxy (8) | Carboxy (1) | — |
| 104 | — | — | — | — | — |
| 105 | — | 9 | Hydroxy (8) | Carboxy (1) | — |
| 106 | Linolenic (16) | — | — | — | — |
| 107 | Linolenic (16) | 32 | Amino (16) | | Linolenic (16) |
| 108 | Linolenic (16) | — | — | — | — |

TABLE 4-continued

| | | | | | |
|---|---|---|---|---|---|
| 109 | Linolenic (16) | 32 | Amino (16) | | Linolenic (16) |
| 110 | — | — | — | | — |
| 111 | — | 64 | Amino (64) | | — |
| 112 | — | 32 | Hydroxy (32) | | — |
| 113 | Linolenic (32) | 64 | Hydroxy (32) | | Linolenic (32) |
| 114 | Linolenic (48) | 64 | Carboxy (16) | | Linolenic (48) |
| 115 | Linolenic (48) | 64 | Deoxycholic (16) | — | Linolenic (48) |
| 116 | Dodecyl acrylate-acrylonitrile (32) | 64 | Hydroxy (32) | | Dodecyl acrylate-acrylonitrile (32) |
| 117 | Linolenic (48) | 64 | Deoxycholic (16) | — | Linolenic (48) |
| 118 | Linolenic (48) | 64 | Pyrene (16) | — | Linolenic (48) |
| c11 | — | — | — | — | — |
| c12 | — | — | — | — | — |
| c13 | — | — | — | — | — |
| c14 | — | — | — | — | — |
| c15 | — | — | — | — | — |

<Notes of table>
Functional group (I): A functional group belonging to the group of functional groups (I)
Functional group (II): A functional group belonging to the group of functional groups (II)
Substituent (a): A substituent belonging to the group of substituents (a)
Number of groups: The total of the number of the functional groups (I), the number of the functional groups (II), and the number of the functional groups (a)
Numerical values in parentheses: The number of functional groups or the number of substituents
For example, functional groups belonging to both the functional group (I) and the functional group (II) such as an amino group are described without being differentiated.
Meanwhile, "groups" in the table are the abbreviation of functional groups.
For example, "deoxycholic" indicates that the functional group (I) is introduced into a dendritic polymer using a deoxycholic acid. In addition, "linolenic" indicates that the substituent (a) is introduced using "linolenic acid".

As is clear from Table 3, it was found that the solid electrolyte compositions, the compositions for a positive electrode, and the compositions for a negative electrode which satisfied the regulations of the present invention were excellent in terms of dispersion stability. In contrast, the solid electrolyte compositions, the compositions for a positive electrode, and the compositions for a negative electrode which failed to satisfy the regulations of the present invention were all below the passing level of the dispersion stability.

<Test>

On the respective sheets of Test Nos. 101 to 118 of the present invention and Test Nos. c11 to c15 for comparison manufactured above, binding property tests were carried out. Furthermore, coin batteries or all-solid state secondary batteries were produced using the respective sheets, and ion conductivities thereof were measured.

Hereinafter, the testing method and the measurement method will be described. In addition, the test and the measurement results are summarized in Table 5.

(Binding Property Test)

12 mm-wide and 60 mm-long CELLOTAPE (registered trademark, manufactured by Nichiban Co., Ltd.) was attached to the solid electrolyte layer (50 mm×12 mm) in the solid electrolyte sheet produced above and peeled off 50 mm at a rate of 10 mm/min. The ratio of the area of the sheet portion that was not peeled off to the area of peeled CELLOTAPE was computed.

In addition, CELLOTAPE was attached to the electrode sheets for an all-solid state secondary battery so that CELLOTAPE came into contact with the negative electrode active material layer, and tests were carried out in the same manner.

The obtained values were evaluated using the following evaluation standards. C or higher ranks are passing levels.
A: 100%
B: 95% or more and less than 100%
C: 80% or more and less than 95%
D: 50% or more and less than 80%
E: Less than 50%

(Ion Conductivity)

—Production of Batteries for Ion Conductivity Measurement—

(1) A disc-shaped piece having a diameter of 14.5 mm was cut out from the solid electrolyte sheet produced above. This solid electrolyte sheet was put into a 2032-type stainless steel coin case into which a spacer and a washer were combined so that a disc-shaped piece having a diameter of 14.5 mm cut out from an aluminum foil came into contact with the solid electrolyte layer. A coin battery was produced in the above-described manner.

(2) A disc-shaped piece having a diameter of 14.5 mm was cut out from the electrode sheet for an all-solid state secondary battery produced above and put into the 2032-type stainless steel coin case into which a spacer and a washer were combined, thereby producing an all-solid state secondary battery.

The battery produced in the above-described manner was used to measure the ion conductivity in a state in which the battery was not pressurized, that is, in the "non-pressurized" state shown in Table 5.

In addition, the battery was inserted into a jig capable of applying a pressure between electrodes from the outside of the battery produced in the above-described manner and used to measure the ion conductivity in the "pressurized" state shown in Table 5. The pressure between electrodes was set to 49 MPa.

—Method for Measuring Ion Conductivity—

Figure 2:
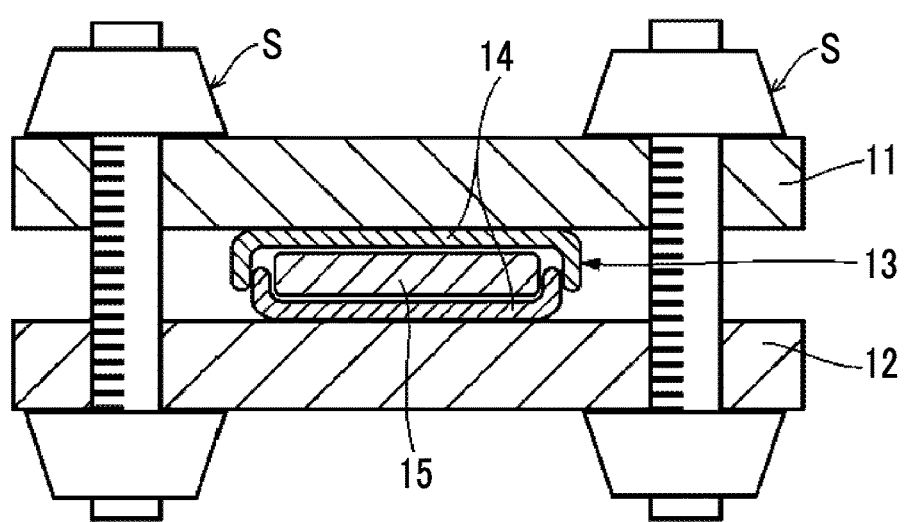
FIG. 2 is a vertical cross-sectional view schematically illustrating a testing device used in examples.

Alternating current impedance was measured in a constant-temperature tank (30° C.) using the above-produced battery and a 1255B FREQUENCY RESPONSE ANALYZER (trade name) manufactured by Solartron Analytical. Inc. at a voltage magnitude of 5 mV and wavelengths of 1 MHz to 1 Hz, thereby obtaining the resistance of a specimen in the film thickness direction and computing the ion conductivity from Expression (B). At this time, a test specimen illustrated in FIG. 2 was used in the pressurization of the battery. Reference sign 11 indicates an upper portion-supporting plate, reference sign 12 indicates a lower portion-supporting plate, reference sign 13 indicates the battery (the coin battery or the all-solid state secondary battery), reference sign 14 indicate a coin case, reference sign 15 indicates the sheet (the solid electrolyte sheet or the electrode sheet for an all-solid state secondary battery), and reference sign S indicates a spring.

Ion conductivity (mS/cm)=1,000×specimen film thickness (cm)/(resistance($\Omega$)×specimen area (cm$^2$))   Expression (B)

In Expression (B), the specimen film thickness refers to the thickness of the solid electrolyte layer or the total thickness of three layers of the positive electrode active material layer, the solid electrolyte layer, and the negative electrode active material layer. In addition, the specimen area refers to the area of the surface of the solid electrolyte layer.

TABLE 5

| Test No. | Binding properties | Ion conductivity (mS/cm) Pressurized | Ion conductivity (mS/cm) Non-pressurized |
|---|---|---|---|
| 101 | A | 0.012 | 0.011 |
| 102 | B | 0.011 | 0.009 |
| 103 | B | 0.11 | 0.1 |
| 104 | A | 0.42 | 0.38 |
| 105 | B | 0.58 | 0.48 |
| 106 | C | 0.09 | 0.08 |
| 107 | B | 0.06 | 0.06 |
| 108 | C | 0.62 | 0.59 |
| 109 | B | 0.62 | 0.58 |
| 110 | C | 0.46 | 0.44 |
| 111 | B | 0.42 | 0.41 |
| 112 | B | 0.54 | 0.52 |
| 113 | B | 0.73 | 0.65 |
| 114 | A | 0.71 | 0.68 |
| 115 | B | 0.88 | 0.78 |
| 116 | B | 0.64 | 0.63 |
| 117 | A | 0.92 | 0.91 |
| 118 | A | 0.95 | 0.93 |
| c11 | D | 0.35 | 0.12 |
| c12 | D | 0.29 | 0.09 |
| c13 | E | 0.32 | 0.13 |
| c14 | E | 0.31 | 0.09 |
| c15 | E | 0.22 | 0.08 |

As is clear from Table 5, it is found that the coin batteries and the all-solid state secondary batteries produced using the solid electrolyte compositions satisfying the regulations of the present invention had excellent binding properties and, even in the non-pressurized state, exhibited the same degree of ion conductivity as in the pressurized state.

In contrast, the coin batteries and the all-solid state secondary batteries produced using the solid electrolyte compositions not satisfying the regulations of the present invention had insufficient binding properties. Furthermore, the ion conductivity in the non-pressurized state was significantly poorer than that in the pressurized state.

The present invention has been described together with the embodiment; however, unless particularly specified, the present inventors do not intend to limit the present invention to any detailed portion of the description and consider that the present invention is supposed to be broadly interpreted within the concept and scope of the present invention described in the claims.

EXPLANATION OF REFERENCES

1: negative electrode collector
2: negative electrode active material layer
3: solid electrolyte layer
4: positive electrode active material layer
5: positive electrode collector
6: operation portion
10: all-solid state secondary battery
11: upper portion-supporting plate
12: lower portion-supporting plate
13: coin battery or all-solid state secondary battery
14: coin case
15: solid electrolyte sheet or electrode sheet for all-solid state secondary battery
S: screw
16: core portion
17A: branch portion
17B: branch portion
18: branched portion
19: molecular terminal portion

What is claimed is:

1. A solid electrolyte composition comprising:
   at least one dendritic polymer selected from the group consisting of dendrons, dendrimers, and hyperbranched polymers; and
   at least one of a sulfide-based inorganic solid electrolyte having conductivity of ions of metals belonging to Group I or II of the periodic table and an oxide-based inorganic solid electrolyte having conductivity of ions of metals belonging to Group I or Group II of the periodic table,
   wherein a content of the dendritic polymer is 0.01 to 20 parts by mass with respect to 100 parts by mass of the inorganic solid electrolyte, and
   wherein the dendritic polymer has at least one functional group selected from a group of functional groups (A),
   <Group of functional groups (A)>
   a hydroxy group, a thiol group, a carboxy group, a sulfonic acid group, a phosphoric acid group, an amino group, a cyano group, an isocyanate group, an acid anhydride group, a (meth)acryloyloxy group, an epoxy group, an oxetanyl group, an alkoxide group, a group having a ring structure of three or more rings, an amide group, a urea group, a urethane group, an imide group, and an isocyanurate group.

2. The solid electrolyte composition according to claim 1, wherein the dendritic polymer has 8 to 2,500 molecular terminal portions in a molecule.

3. The solid electrolyte composition according to claim 1, wherein a number-average molecular weight of the dendritic polymer is 500 to 500,000.

4. The solid electrolyte composition according to claim 1, wherein an average particle diameter of the dendritic polymer is 1 nm to 100 nm.

5. The solid electrolyte composition according to claim 1, wherein the dendritic polymer has an arm portion extending from the molecular terminal portion, and the arm portion is a continuous chain-like polymer having a number-average molecular weight of 1,000 or more and has at least one substituent selected from a group of substituents (a),
   <Group of substituents (a)>
   an alkyl group having 8 or more carbon atoms, an alkenyl group having 8 or more carbon atoms, an alkynyl group having 8 or more carbon atoms, a polyether group, a polycarbonate group, a polyester group, and a polysiloxane group which have a number-average molecular weight of 300 or more.

6. The solid electrolyte composition according to claim 1, wherein the group having a ring structure of three or more rings is a residue of a compound represented by General Formula (1) or (2),

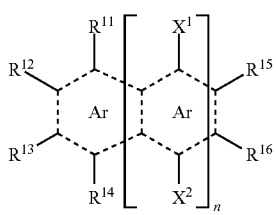

General Formula (1)

in General Formula (1), Ar represents a benzene ring, n represents an integer of 0 to 8, $R^{11}$ to $R^{16}$ each independently represent a hydrogen atom or a substituent, $X^1$ and $X^2$ each independently represent a hydrogen atom or a substituent, here, in $R^{11}$ to $R^{16}$, $X^1$, and $X^2$, groups adjacent to each other may be bonded to each other and thus form a five or six-membered ring, here, in a case in which n is zero, the substituent as any one of $R^{11}$ to $R^{13}$ is —$(Ar^1)$m-Rxx or any two of $R^{11}$ to $R^{13}$ are bonded to each other and thus form —$(Ar^1)$m-, here, $Ar^1$ represents a phenylene group, m represents an integer of 2 or more, Rxx represents a hydrogen atom or a substituent, in addition, in a case in which n is one, in $R^{11}$ to $R^{16}$, $X^1$, and $X^2$, at least two groups adjacent to each other are bonded to each other and thus form a benzene ring,

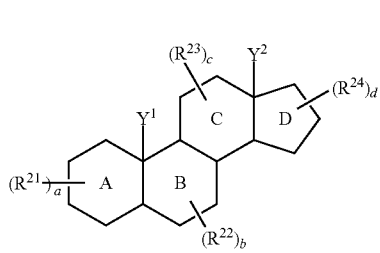

General Formula (2)

in General Formula (2), $Y^1$ and $Y^2$ each independently represent a hydrogen atom, a methyl group, or a formyl group, $R^{21}$, $R^{22}$, $R^{23}$, and $R^{24}$ each independently represent a substituent, a, b, c, and d represent an integer of 0 to 4, here, an A ring may be a saturated ring, an unsaturated ring or aromatic ring having one or two double bonds, a B ring and a C ring may be unsaturated rings having one or two double bonds, meanwhile, in a case in which each of a, b, c, and d is an integer of 2 to 4, substituents adjacent to each other may be bonded to each other and thus form a ring.

7. The solid electrolyte composition according to claim 1, further comprising:
a lithium salt.

8. The solid electrolyte composition according to claim 1, wherein the inorganic solid electrolyte is a sulfide-based inorganic solid electrolyte.

9. The solid electrolyte composition according to claim 1, further comprising:
at least one solvent selected from the group consisting of an alcohol compound solvent, an ether compound solvent, an amide compound solvent, an aromatic compound solvent, an ester compound solvent, and an aliphatic compound solvent.

10. An electrode sheet for an all-solid state secondary battery comprising:
a collector; and
a solid electrolyte layer containing at least one dendritic polymer selected from the group consisting of dendrons, dendrimers, and hyperbranched polymers and at least one of a sulfide-based inorganic solid electrolyte having conductivity of ions of metals belonging to Group I or II of the periodic table and an oxide-based inorganic solid electrolyte having conductivity of ions of metals belonging to Group I or Group II of the periodic table,
wherein a content of the dendritic polymer is 0.01 to 20 parts by mass with respect to 100 parts by mass of the inorganic solid electrolyte, and
wherein the dendritic polymer has at least one functional group selected from a group of functional groups (A),
<Group of functional groups (A)>
a hydroxy group, a thiol group, a carboxy group, a sulfonic acid group, a phosphoric acid group, an amino group, a cyano group, an isocyanate group, an acid anhydride group, a (meth)acryloyloxy group, an epoxy group, an oxetanyl group, an alkoxide group, a group having a ring structure of three or more rings, an amide group, a urea group, a urethane group, an imide group, and an isocyanurate group.

11. A method for manufacturing an electrode sheet for an all-solid state secondary battery, the method comprising:
a step of applying a wet slurry of the solid electrolyte composition according to claim 1; and
a step of drying the slurry.

12. An all-solid state secondary battery comprising:
the electrode sheet for an all-solid state secondary battery according to claim 10.

13. A method for manufacturing an all-solid state secondary battery, the method comprising:
manufacturing an all-solid state secondary battery having a positive electrode active material layer, a solid electrolyte layer, and a negative electrode active material layer in this order through the manufacturing method according to claim 11.

14. The solid electrolyte composition according to claim 1, further comprising:
an active material.

15. An electrode sheet for an all-solid state secondary battery comprising:
a collector; and
an electrode layer containing at least one dendritic polymer selected from the group consisting of dendrons, dendrimers, and hyperbranched polymers, an active material and at least one of a sulfide-based inorganic solid electrolyte having conductivity of ions of metals belonging to Group I or II of the periodic table and an oxide-based inorganic solid electrolyte having conductivity of ions of metals belonging to Group I or Group II of the periodic table,
wherein a content of the dendritic polymer is 0.01 to 20 parts by mass with respect to 100 parts by mass of the inorganic solid electrolyte, and
wherein the dendritic polymer has at least one functional group selected from a group of functional groups (A),
<Group of functional groups (A)>
a hydroxy group, a thiol group, a carboxy group, a sulfonic acid group, a phosphoric acid group, an amino group, a cyano group, an isocyanate group, an acid anhydride group, a (meth)acryloyloxy group, an epoxy group, an oxetanyl group, an alkoxide group, a group having a ring structure of three or more rings, an amide group, a urea group, a urethane group, an imide group, and an isocyanurate group.

16. A solid electrolyte sheet comprising:
at least one dendritic polymer selected from the group consisting of dendrons, dendrimers, and hyperbranched polymers and at least one of a sulfide-based inorganic solid electrolyte having conductivity of ions of metals belonging to Group I or II of the periodic table and an oxide-based inorganic solid electrolyte having conductivity of ions of metals belonging to Group I or Group II of the periodic table,
wherein a content of the dendritic polymer is 0.01 to 20 parts by mass with respect to 100 parts by mass of the inorganic solid electrolyte, and
wherein the dendritic polymer has at least one functional group selected from a group of functional groups (II),
<Group of functional groups (II)>
a hydroxy group, a thiol group, a carboxy group, a sulfonic acid group, a phosphoric acid group, an amino group, a cyano group, an isocyanate group, an amide group, a urea group, a urethane group, an imide group, and an isocyanurate group.

* * * * *